(12) United States Patent
Kozaki et al.

(10) Patent No.: US 9,264,213 B2
(45) Date of Patent: Feb. 16, 2016

(54) TIME SYNCHRONIZATION METHOD FOR COMMUNICATION SYSTEM, SLAVE STATION APPARATUS, MASTER STATION APPARATUS, CONTROL DEVICE, AND PROGRAM

(75) Inventors: Seiji Kozaki, Tokyo (JP); Kenichi Nakura, Tokyo (JP); Yoshifumi Hotta, Tokyo (JP); Jun Mizuguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 99 days.

(21) Appl. No.: 13/976,188

(22) PCT Filed: Feb. 6, 2012

(86) PCT No.: PCT/JP2012/052637
§ 371 (c)(1),
(2), (4) Date: Jun. 26, 2013

(87) PCT Pub. No.: WO2012/108387
PCT Pub. Date: Aug. 16, 2012

(65) Prior Publication Data
US 2013/0266306 A1 Oct. 10, 2013

(30) Foreign Application Priority Data
Feb. 8, 2011 (JP) .................................. 2011-024886

(51) Int. Cl.
*H04L 7/00* (2006.01)
*H04J 3/06* (2006.01)
(Continued)

(52) U.S. Cl.
CPC ............. *H04L 7/0075* (2013.01); *H04J 3/0655* (2013.01); *H04Q 11/0067* (2013.01); *H04J 3/0641* (2013.01); *H04J 3/0667* (2013.01); *H04Q 2011/0081* (2013.01)

(58) Field of Classification Search
CPC ..... H04J 3/0655; H04J 3/0641; H04J 3/0667; H04L 7/0075; H04Q 11/0067
USPC ...................................................... 398/5, 2, 1
See application file for complete search history.

(56) References Cited

U.S. PATENT DOCUMENTS 8,027,258 B2 * 9/2011 Mizutani et al. .............. 370/236
8,422,375 B2 4/2013 Mizutani et al.
(Continued)

FOREIGN PATENT DOCUMENTS

JP 2001 119345 4/2001
JP 2002 44119 2/2002
(Continued)

OTHER PUBLICATIONS
International Search Report Issued May 15, 2012 in PCT/JP12/52637 Filed Feb. 6, 2012.
(Continued)

*Primary Examiner* — Oommen Jacob
(74) *Attorney, Agent, or Firm* — Oblon, McClelland, Maier & Neustadt, L.L.P.

(57) ABSTRACT

A time synchronization method for a communication system configured to perform protection switching, the communication system including a first network in which a master station and a slave station are connected via plural physical lines including a working line and a backup line and a second network connected to the slave station, the method including a time synchronization in which the slave station executes, when not detecting a communication failure of a downlink signal transmitted from the master station, synchronization processing for synchronizing, based on a clock of the slave station and timing information, time information transmitted to the second network with time information included in a time synchronization command and suppresses, when detecting a communication failure or receiving a switching notification from the master station apparatus, a synchronization error due to a difference between the clock of the slave station and the timing information.

21 Claims, 21 Drawing Sheets

(51) Int. Cl.
*H04L 12/24* (2006.01)
*H04Q 11/00* (2006.01)

(56) References Cited

U.S. PATENT DOCUMENTS

| | | | | |
|---|---|---|---|---|
| 2002/0141340 | A1* | 10/2002 | Tamura et al. | 370/231 |
| 2004/0001516 | A1* | 1/2004 | Friedrichs et al. | 370/506 |
| 2009/0016299 | A1 | 1/2009 | Watanabe et al. | |
| 2010/0002591 | A1 | 1/2010 | Mizutani et al. | |
| 2013/0045010 | A1* | 2/2013 | Mukai | 398/52 |
| 2013/0266306 | A1* | 10/2013 | Kozaki et al. | 398/5 |
| 2014/0025985 | A1* | 1/2014 | Tochio | 714/4.2 |

FOREIGN PATENT DOCUMENTS

| | | |
|---|---|---|
| JP | 2002 94493 | 3/2002 |
| JP | 2002 300186 | 10/2002 |
| JP | 2009 21722 | 1/2009 |
| JP | 2010 16691 | 1/2010 |
| WO | 2008 126162 | 10/2008 |
| WO | 2011 145218 | 11/2011 |

OTHER PUBLICATIONS

Combined Chinese Office Action and Search Report issued Jan. 28, 2015 in Patent Application No. 201280006258.1 (with partial English language translation and English translation of categories of cited documents).

* cited by examiner

TIME SYNCHRONIZATION METHOD FOR COMMUNICATION SYSTEM, SLAVE STATION APPARATUS, MASTER STATION APPARATUS, CONTROL DEVICE, AND PROGRAM

FIELD

The present invention relates to a time synchronization method for a communication system connected by redundant communication lines, a slave station apparatus, a master station apparatus, a control device, and a program.

BACKGROUND

In a precise time synchronization protocol IEEE (The Institute of Electrical and Electronic Engineers) 1588 standard, a plurality of nodes connected to a network can share time information by exchanging the time information on the network. When the nodes conforming to the IEEE 1588 standard receive time information from adjacent nodes, the nodes correct time information taking into account a propagation delay of a communication path, prevent occurrence of an error of the time information due to the propagation delay, and realize a high-precision synchronization. Therefore, a measurement of the propagation delay on the communication path has to be accurately performed.

On the other hand, to improve failure resistance on the communication path, a redundant system in which a communication path among nodes is configured by a plurality of lines has been devised.

Japanese Patent Application Laid-open No. 2001-119345 discloses an optical communication system in which an OLT (Optical Line Terminal: a station side terminating apparatus) and a star coupler are connected by two redundant optical fibers (Patent Literature 1).

WO 2008/126162 discloses a protection system that switches a line in use from a working optical fiber to a backup optical fiber when an OLT does not receive an uplink signal from an ONU (Optical Network Unit: a user side terminating apparatus) for a fixed time (Patent Literature 2).

CITATION LIST

Patent Literature

Patent Literature 1: Japanese Patent Application Laid-open No. 2001-119345 (FIG. 1)
Patent Literature 2: WO 2008/126162 (FIG. 1)

SUMMARY

Technical Problem

In such a protection system in the past, a communication path is switched according to a situation. Therefore, when the switching of the communication path occurs during the time synchronization, it is likely that a delay time changes and a large error occurs in time information corrected by a receiving node.

The present invention has been devised in view of the above and it is an object of the present invention to obtain a time synchronization method for a communication system, a slave station apparatus, a master station apparatus, a control device, and a program that are capable of improving time synchronization accuracy during line switching.

Solution to Problem

In order to solve above-mentioned problems and achieve the object of the present invention, according to an aspect of the present invention, there is provided a time synchronization method for a communication system configured to perform protection switching, the communication system including a first network in which an OLT (Optical Line Terminal) and an ONU (Optical Network Unit) are connected via a plurality of physical lines including a working line and a backup line and a second network connected to the ONU, the time synchronization method comprising: a step in which the OLT transmits a synchronization signal to the ONU and the ONU synchronizes a clock of the ONU with a clock of the OLT using the received synchronization signal; a step in which the OLT transmits a synchronization command including designated time information and timing information to the ONU; a switching step for performing a protection switching in which the OLT uses, when detecting a communication failure of an uplink signal in the working line, the backup line as a new working line instead of the working line; and a time synchronization step in which the ONU executes, when not detecting a switching condition for the protection switching based on a downlink signal transmitted from the OLT, synchronization processing for correcting the time information included in the synchronization command based on the clock of the ONU and the timing information and transmitting the synchronization command to the second network and executing, when detecting the switching condition for the protection switching or receiving a switching notification from the OLT, processing for suppressing a synchronization error due to a difference between the clock of the ONU and the timing information.

According to another aspect of the present invention, there is provided a slave station apparatus comprising: a receiver connected to a master station apparatus via a first network, which is configured using redundant lines, and configured to receive a synchronization signal for synchronizing with the master station apparatus and a synchronization command including time information transferred to a second network; a clock configured to measure time in synchronization with the synchronization signal received from the master station apparatus; a control device configured to perform synchronization processing for extracting the time information and timing information from the synchronization command and correcting the time information based on the timing information and output time of the clock and execute, when detecting a factor of switching occurrence of line switching in the first network or receiving a switching notification from the master station apparatus in communication with the master station apparatus, processing for suppressing a synchronization error due to a difference between the clock and the timing information; and an interface device connected to the second network and configured to transmit, as a synchronization message of the second network, the time information corrected by the control device.

According to still another aspect of the present invention, there is provided a master station apparatus configured to transmit time information to a second network connected to a slave station apparatus via a first network, which is configured using redundant lines, the master station apparatus comprising: a plurality of transceivers connected to the first network; and a control device configured to transmit, to the slave station apparatus via the transceiver, a synchronization signal used for synchronization of transmission and reception timing on the first network and perform, when a failure occurs in a working line among the redundant lines due to an uplink signal received by the transceiver, line switching for using a backup line as a new working line, wherein the control device transmits, to the slave station apparatus via the transceiver, a synchronization command including time information transmitted to the second network and timing information in the first network and, when the line switching is performed, compensates for the time information with a delay time of the new working line.

According to still another aspect of the present invention, there is provided a control device of a slave station apparatus connected to a master station apparatus via a first network, which is configured using redundant lines, and configured to receive a synchronization signal for synchronizing with the master station apparatus and a synchronization command including time information transferred to a second network, wherein the control device performs synchronization processing for extracting the time information and timing information from the synchronization command and correcting the time information based on the timing information and output time of a local clock of the slave station apparatus and executes, when detecting a communication failure in the first network or receiving a signal for notifying switching from the master station apparatus in communication with the master station apparatus, processing for suppressing a synchronization error due to a difference between the local clock and the timing information.

According to still another aspect of the present invention, there is provided a control device of a master station apparatus configured to transmit time information to a second network connected to a slave station apparatus via a transceiver connected to a first network, which is configured using redundant lines, wherein the control device transmits, to the slave station apparatus via the transceiver, a synchronization signal used for synchronization of transmission and reception timing on the first network, performs, when a failure occurs in a working line among the redundant lines due to an uplink signal received by the transceiver, line switching for using a backup line as a new working line, transmits, to the slave station apparatus via the transceiver, a synchronization command including time information transmitted to the second network and timing information in the first network, and, when the line switching is performed, compensates for the time information with a delay time of the new working line.

Advantageous Effects of Invention

The time synchronization method, the slave station apparatus, the master station apparatus, the control devices of the slave station apparatus and the master station apparatus, and the program according to the present invention attain an effect that it is possible to improve time synchronization accuracy during line switching.

DESCRIPTION OF EMBODIMENTS

Embodiments of a time synchronization method, a slave station apparatus, a master station apparatus, a control device, and a program according to the present invention are explained in detail below based on the drawings. The present invention is not limited by the embodiments.

First Embodiment

Figure 1:
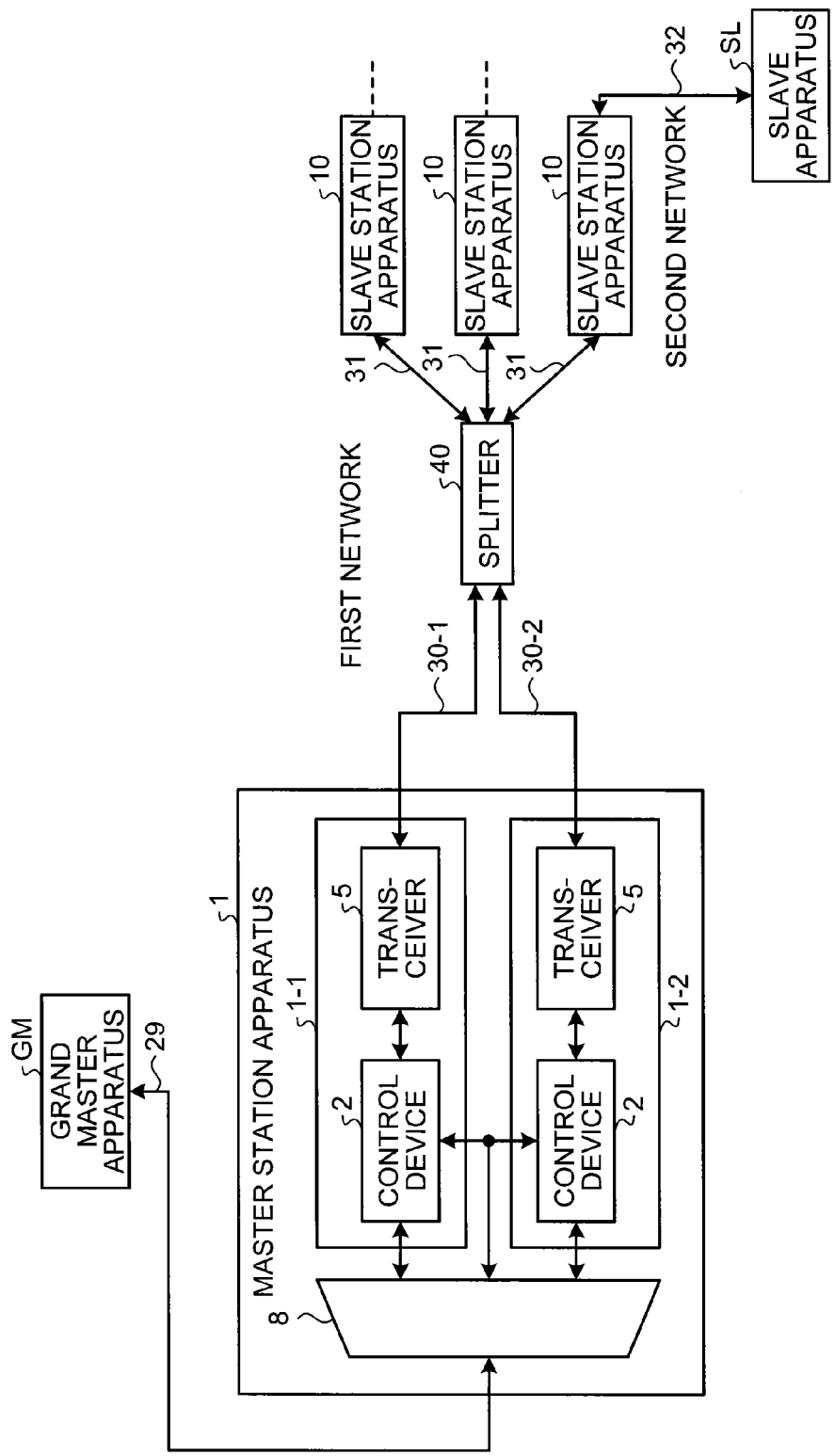
FIG. 1 is a configuration diagram of the configuration of a communication system in an embodiment of the present invention.

FIG. 1 shows a time synchronization system in which a time-synchronized slave apparatus SL is connected to a grand master apparatus GM, which performs time synchronization, by a plurality of networks. The grand master apparatus GM is an apparatus that time-synchronizes the slave apparatus SL by repeatedly regularly or irregularly transmitting highly precise time information to the slave apparatus SL. The slave apparatus SL can receive the time information, correct a clock of the slave apparatus SL based on the received time information, and acquire a delay time on a second network, and acquire highly precise time information same as time on the grand master apparatus GM. The grand master apparatus GM can be any apparatus that has time synchronization such as a master apparatus of IEEE 1588 or a GPS (Global Positioning System) reception apparatus.

A first network is a network that relays time information to the second network to which the slave apparatus SL is connected. The first network connects a master station apparatus 1 and slave station apparatuses 10 using a plurality of redundant lines 30-1 and 30-2. An example of the first network is a PON (Passive Optical Network) system. An example of the second network is an IEEE 1588 network.

The master station apparatus 1 performs setting of communication lines between the master station apparatus 1 and the slave station apparatuses 10 and controls communication on the first network. The master station apparatus 1 and the slave station apparatuses 10 are connected by the redundant communication lines 30-1 and 30-2. In the communication system shown in FIG. 1, the master station apparatus 1 to a splitter 40 are made redundant. Such a redundant system is called a TYPE-B protection system in the PON (Passive Optical Network) system. The master station apparatus 1 includes OLTs 1-1 and 1-2 for each of the lines 30-1 and 30-2. While one OLT communicates with the slave station apparetutes 10 as a working apparatus, the other OLT stays on standby as a backup apparatus until a failure occurs in the working apparatus. The OLTs 1-1 and 1-2 include transceivers 5 connected to the lines 30-1 and 30-2 and control devices 2 that control the transceivers 5.

A switch 8 is a device that switches connection of the control device 2 and an external apparatus or a network according to a switching signal from the control device 2. The splitter 40 divides signals of the lines 30-1 and 30-2 and transmits the signals to lines 31. Further, the splitter 40 transmits signals of the lines 31 to the lines 30-1 and 30-2. The communication lines 30-1 and 30-2 are physical lines such as optical fibers having different physical paths. The physical lines can accomodaate a plurality of logical links.

The slave station apparatus 10 is an apparatus (e.g., an ONU) that relays, to the second network, time information transmitted from the first network.

An overview of a time synchronization operation of the communication system is explained. The grand master apparatus GM stores time information in a synchronization message (Sync message) and transmits the synchronization message to the master station apparatus 1 via a line 29. The master station apparatus 1 extracts the time information from the synchronization message, corrects the time information using delay times of the line 29 and the first network measured in advance and processing time of the master station apparatus 1, and transmits the time information to the slave station apparatus 10. The corrected time information is converted into a synchronization command (TimeSync) together with a time stamp, which is local time information in the first network, and transmitted from the master station apparatus 1.

The slave station apparatus 10, which receives the synchronization command, compares the time stamp of the synchronization command and time (timing information) indicated by a clock of the slave station apparatus 10 (a PON clock) and corrects the time information of the synchronization command based on a difference between the time stamp and the time. Subsequently, the slave station apparatus 10 converts the corrected time information into a synchronization message (Sync message) in the second network and transmits the synchronization message to the slave apparatus SL. Upon receiving the synchronization message, the slave apparatus SL extracts the time information from the synchronization message and corrects the time information using a delay time of the second network measured in advance. The slave apparatus SL can synchronize with time of the grand master apparatus GM by synchronizing time of the clock of the slave apparatus SL with the corrected time information.

An overview of a line switching operation is as explained below.

The master station apparatus 1 designates one of the redundant lines 30-1 and 30-2, for example, the line 30-1 as a working communication line and performs communication with the slave station apparatus 10. The remaining communication line is designated as a backup communication line, for example, the line 30-2 and is set in a standby state in preparation for occurrence of a failure. In the first network, the master station apparatus 1 transmits a time stamp (timing information) to the slave station apparatus 10 via the working line 30-1 and performs local time synchronization. The slave station apparatus 10 periodically corrects a free-running counter (a PON clock or an MPCP counter) of the slave station apparatus 10 based on the time stamp and synchronizes with the master station apparatus 1 and the other slave station apparatuses 10. The time stamp indicated by the PON clock in the PON system is used, for example, by the slave station apparatus 10 to control transmission timing.

The master station apparatus 1 monitors a failure of the line 30 from a state of a reception signal. When a failure occurs, the master station apparatus 1 switches a line used for transmission and reception from the working communication line 30-1 to the backup communication line 30-2. After the switch, the line 30-2 is used as a new working communication line. The line 30-2 has a transmission delay characteristic different from a transmission delay characteristic of the communication line 30-1. Therefore, in switching the line, the master station apparatus 1 needs to transmit the time stamp via the line 30-2 and execute re-synchronization processing with the slave station apparatuses 10.

As explained above, the synchronization processing executed in the slave station apparatus 10 is performed based on a local clock of the slave station apparatus 10, which is line-dependent timing information. Therefore, when the synchronization command and the time stamp are transmitted through different lines before and after the line switching, an error occurs in the correction of the time information executed in the slave station apparatus 10.

Further, as in the TYPE-B protection system, when the redundant lines 30-1 and 30-2 are combined with the common line 31 and connected to the slave station apparatus 10, the slave station apparatus 10 cannot distinguish whether a reception signal is a signal that reaches the slave station apparatus 10 passing through the redundant line 30-1 or passing through the redundant line 30-2. Therefore, fluctuation in a local clock based on a time stamp transmitted through the line 30-2 after the switching (a time stamp drift) and an error of correction based on the fluctuation in the local clock tend to occur.

Figure 2:
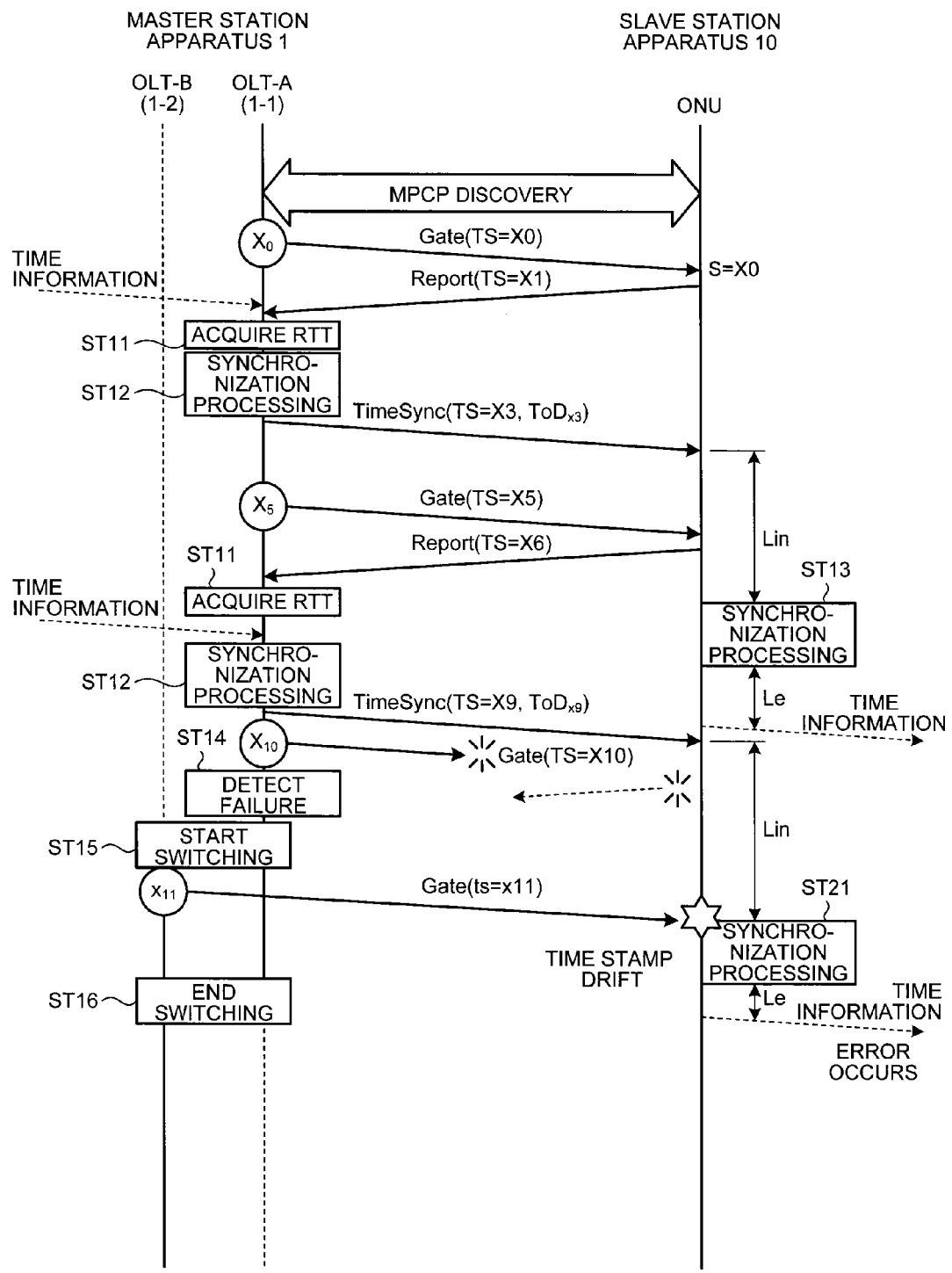
FIG. 2 is a sequence chart for explaining time synchronization control in an imaginary case.

A sequence of occurrence of an error in time information due to line switching is shown in FIG. 2. The sequence indicates an imaginary example in which it is assumed that protection control during the line switching is not caused to function. First, on a master station side, an OLT 1-1 (an OLT-A) starts operation functioning as a working master station apparatus, searches for the slave station apparatus 10 (an ONU) connected to the first network, and registers a found slave station apparatus 10 in the OLT 1-1 as a communication partner. An example of this processing is an MPCP (Multi-Point control protocol) discovery of an optical access system.

Subsequently, the master station apparatus 1 measures a transmission delay time on the first network. The PON system has a function for the delay time measurement. The OLT 1-1 transmits a Gate message for granting an uplink transmission band to the ONU 10 and measures a round trip time (RTT) based on an arrival time of a Report message, which is a response signal to the Gate message (step ST11). The transmission and reception of the Gate message is performed as local synchronization processing of the first network as well. The ONU 10 corrects time S of a local clock of the ONU 10 using time stamp information X0 of the master station apparatus 1 described in the Gate message and synchronizes the local clock of the ONU 10 with a local clock of the master station apparatus 1.

Upon receiving, from the grand master apparatus GM, a Sync message that designates time information, the master station apparatus 1 (the OLT 1-1) executes synchronization processing (step ST12). In the synchronization processing, the master station apparatus 1 corrects the received time information using the RTT. The master station apparatus 1 stores time information ToDX3 after the correction in a TimeSync message together with time stamp information X3 of the master station apparatus 1 and transmits the TimeSync message to the slave station apparatus 10 (the ONU). ToDX3 indicates time information at the time when a time stamp indicates X3 in the slave station apparatus 10.

Upon receiving the TimeSync message, the slave station apparatus 10 executes synchronization processing (step ST13). However, it takes time to start the synchronization processing executed by the slave station apparatus 10. A delay in start time (a delay time Lin) is caused by a processing time or the like of a layer lower than the synchronization processing because the synchronization processing is executed in a layer higher than a physical layer.

The slave station apparatus 10 corrects the time information ToDX3 based on a difference between the time stamp X3 of the TimeSync message and the time S indicated by the local clock of the slave station apparatus 10 and calculates present correct time. When the slave station apparatus 10 transmits time information to the second network after the execution of the synchronization processing, the delay time Le occurs. Therefore, the slave station apparatus 10 creates time information for transmission taking into account such a delay time as well and stores the time information for transmission in the Sync message. The Sync message created in this way is transmitted from the slave station apparatus 10 to the slave apparatus SL via the second network. The slave apparatus SL performs, based on the time information of the received Sync message and the delay time of the second network, correction of time measured by the slave apparatus SL and synchronizes the clock of the slave apparatus SL with time of the grand master apparatus GM.

Redundant switching executed when a communication failure occurs in the first network is explained. It is assumed that, at timing X10, the Gate message transmitted by the master station apparatus 1 is not received by the slave station apparatus 10 because of, for example, a failure of the line 30-1. The master station apparatus 1 always monitors an abnormality of the communication line. Upon detecting an abnormality (step ST14), the master station apparatus 1 starts redundant switching processing for switching the line 30 (step ST15). For example, when the slave station apparatus 10 does not return a response signal (Report) in response to the Gate message, the master station apparatus 1 detects a warning of input signal interruption (LoS: Loss of signal or LoB: Loss of Burst).

At the timing X10 in FIG. 2, because the slave station apparatus 10 has not received the Gate message, the slave station apparatus 10 has not transmitted the Report message. Therefore, the master station apparatus 1 detects that the Report message from the slave station apparatus 10 is not received and carries out line switching. In the failure detection, because, for example, in some case, a line temporarily becomes unstable or a problem occurs in a branch line 31 rather than in the redundant lines 30-1 and 30-2, the master station apparatus 1 can be adapted to execute the switching processing when a plurality of times of non-reception of signals (LoS or LoB) is detected or when a failure occurs not only in communication with one slave station apparatus 10 but also in communication with a large number of slave stations or all slave stations.

When the switching processing is started, the master station apparatus 1 stops transmitting a signal using the working line 30-1 and starts to transmit a signal using the backup line 30-2. At this point, the OLT 1-1 transmits a switching request signal to the OLT 1-2 (an OLT-B). The control device 2 of the OLT 1-2, which receives the request signal, continues the processing in place of the control device 2 of the OLT 1-1. Parameters necessary for processing (time information can be included in the parameters) are shared in advance or transmitted from the OLT 1-1 to the OLT 1-2 during switching.

The OLT 1-2, which starts the processing according to the switching, transmits a control message (Gate) to the slave station apparatus 10 and resumes the communication with the slave station apparatus 10 through the switched line 30-2. In the Gate message, a time stamp is recorded as timing information to accurately synchronize with the slave station apparatus 10 on the new line 30-2.

Upon receiving the Gate message, the slave station apparatus 10 performs correction of the local clock based on the time stamp as usual. However, at this point, the time stamp received through a different communication path sometimes greatly deviates from the local clock of the slave station apparatus 10 that synchronizes with the OLT 1-1 before the switching (time stamp drift). Likewise, when the OLT 1-2 sets a time stamp asynchronous with the time stamp of the OLT 1-1 and transmits the time stamp, the time stamp drift occurs.

As explained above, the time information ToD transmitted using the TimeSync message is corrected using the local clock of the slave station apparatus 10. Therefore, when the switching processing is performed and the time stamp drift occurs until the delay time Lin after a reception point of the TimeSync message (e.g., S=X9), it is likely that a large error occurs in time information after the synchronization processing (step ST21). That is, if time information ToDX9 based on the time stamp before the switching is corrected according to a time stamp x11 after the switching, an error equivalent to the time stamp drift occurs in the time information ToD after the correction.

Figure 3:
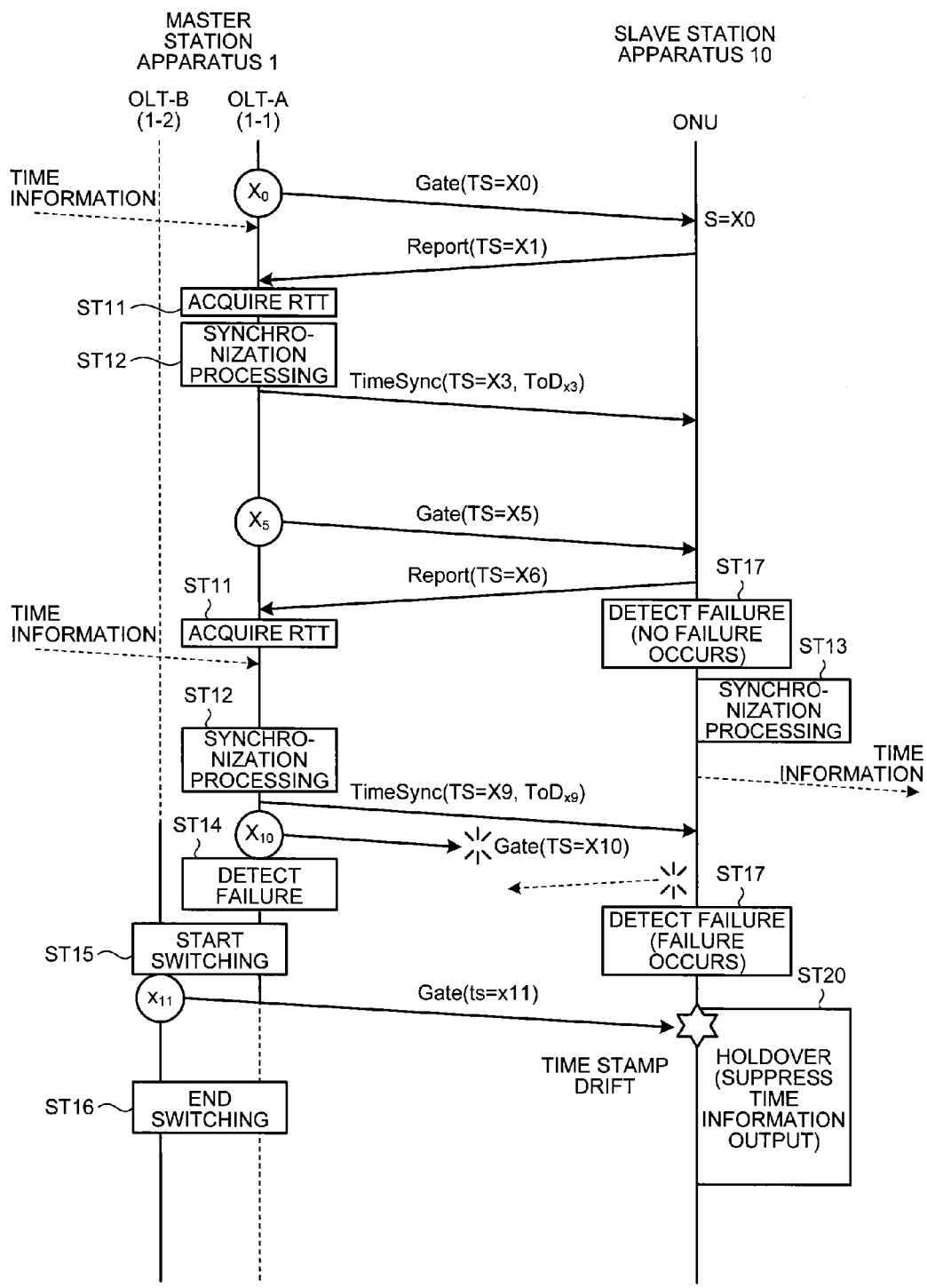
FIG. 3 is a sequence chart for explaining time synchronization control in a first embodiment of the present invention.

Therefore, in the synchronization method in this embodiment, as indicated by step S17 in FIG. 3, the slave station apparatus 10 performs failure detection. When determining that a failure occurs (i.e., when predicting occurrence of switching), the slave station apparatus 10 suppresses an output of time information to the second network. In FIG. 3, reference signs same as the reference signs in FIG. 2 represent the same or equivalent processing.

A sequence shown in FIG. 3 is the same as the sequence shown in FIG. 2 except failure detection ST17 and holdover ST20.

The slave station apparatus 10 monitors the communication lines 31 and determines, based on a reception signal, whether a line failure occurs (step ST17). For example, the slave station apparatus 10 determines that a line failure occurs, for example, when an optical signal is not detected in a receiver or a time stamp drift error occurs. The time stamp drift error is an error detected when a difference between a time stamp of the reception signal and the local clock exceeds a threshold set in advance.

Upon detecting the line failure, the ONU 10 shifts to a holdover state for stopping the synchronization processing for the time information or stopping the output of the time information (step ST20). In the holdover state, even if a synchronization command (a TimeSync message) is received, the slave station apparatus 10 does not execute the synchronization processing and retains time corrected before (for the purpose of performing the synchronization processing) or stops the output of the time information to the second network. Therefore, even if a new time stamp is received from the master station apparatus 1 after line switching and the local clock is corrected, it is possible to suppress propagation of an error involved in the correction to the second network. In the holdover state, the ONU 10 can protect the local clock before the line switching and execute correction of the time information using the protected local clock.

In the slave apparatus SL connected to the second network, time is measured by timing unit in the slave apparatus SL. Therefore, if an error per unit time of the timing unit is small, even if correction of time of the timing means by a synchronization message is skipped, a significant problem does not occur.

When the line switching by the master station apparatus 1 ends (step ST16), the transmission and reception by the OLT 1-1 (the OLT-A) is stopped. The OLT 1-1 shifts to a standby state as a new backup terminating apparatus. On the other hand, the OLT 1-2 (the OLT-B) starts, functioning as a new working terminating apparatus, communication same as the communication before the line switching. The slave station apparatus 10 ends the processing of the holdover according to an end condition for the holdover state set in advance and resumes the transmission of time information to the second network as usual. At this point, time information considered to include an error is deleted or corrected and output.

As the end condition for the holdover, any condition can be used as long as the condition has an effect of suppressing error occurrence. Examples of the end condition include conditions described below.
(1) The slave station apparatus 10 determines the end of the holdover according to whether time set in advance elapses from the start of the holdover.
(2) The slave station apparatus 10 determines the completion of the line switching according to a type of a reception signal of the first network.
(3) The slave station apparatus 10 requests the master station apparatus 1 to permit the end of the holdover state and determines the end of the holdover according to presence or absence of reception of a permission signal.

When the master station apparatus 1 receives, after the line switching, new time information from the grand master apparatus GM, the master station apparatus 1 transmits the synchronization command (the TimeSync message) to the slave station apparatus 10 as explained above. Upon receiving the synchronization command, the slave station apparatus 10 performs the synchronization processing based on the synchronization command and transmits a synchronization message to the slave apparatus SL.

As explained above, in the communication system and the time synchronization method in this embodiment, during the line switching, the slave station apparatus 10 detects a factor of occurrence of the line switching and stops the output of the time information to the slave apparatus. Therefore, it is possible to effectively suppress occurrence of an unpredictable error involved in the line switching.

Second Embodiment

As a second embodiment of the present invention, an example of the OLT 1, the ONU 10, and control devices of the OLT 1 and the ONU 10 for executing a time synchronization method is explained.

Figure 4:
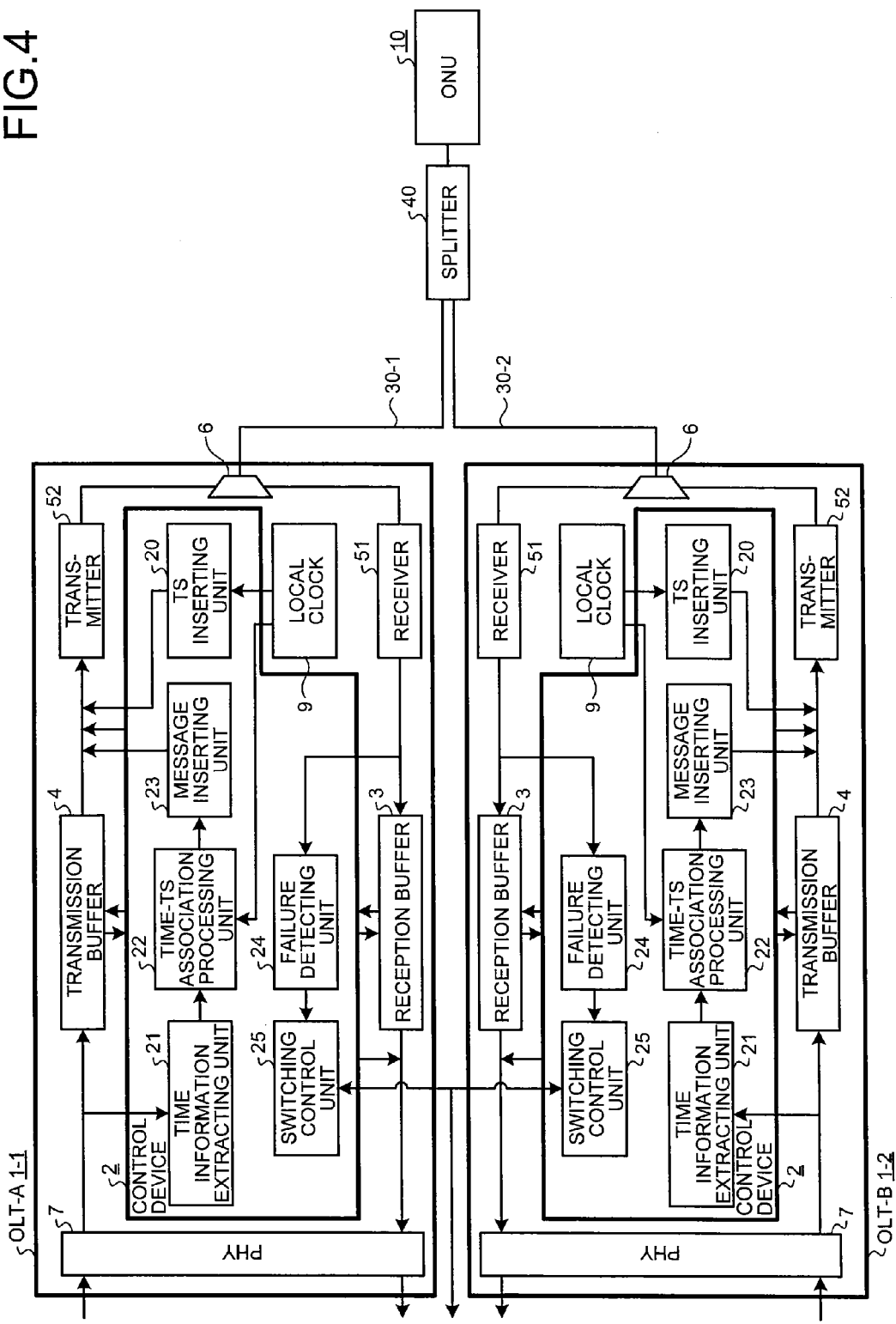
FIG. 4 is a configuration diagram of the configuration of a master station apparatus in a second embodiment of the present invention.

FIG. 4 shows two OLTs 1 that function as the master station apparatus 1. In FIG. 4, reference numerals same as the reference numerals in FIG. 1 represent the same or equivalent sections. The OLT 1-1 and the OLT 1-2 (in the following explanation, when the OLTs are not distinguished, the OLTs are referred to as OLT 1) have the same internal configuration. One of the OLTs 1-1 and 1-2 operates as a working OLT and the other operates as a backup OLT.

Each of the OLTs 1 includes a physical-layer processing unit (PHY) 7 connected to the switch 8 shown in FIG. 1 and configured to realize a physical interface function of an NNI (Network Node Interface) between the grand master apparatus GM and a network, a transmission buffer 4 configured to temporarily store a signal received by the physical-layer processing unit 7, and a transmitter 52 configured to convert a control signal and data output from the transmission buffer 4 and the control device 2 into an optical signal and output the optical signal. The optical signal output from the transmitter 52 is sent to a WDM (Wavelength Division Multiplexing) coupler 6 and transmitted to the line 30. The WDM coupler 6 is a coupler that wavelength-multiplexes uplink data and downlink data. The WDM coupler 6 sends the optical signal received from the ONU 10 to a receiver 51.

The receiver 51 converts the received optical signal into an electric signal and outputs the electric signal to a reception buffer 3 as reception data. The reception buffer 3 temporarily stores the data and outputs the data in response to an access by the physical-layer processing unit 7 and the control device 2. A local clock 9 is also called PON counter. The local clock 9 regularly counts up 32-bit time information and provides a clock serving as a reference for transmission and reception timing in a first network. A time-stamp (TS) inserting unit 20 acquires a time stamp (MPCP counter information) from the local clock 9, stores the time stamp in a Gate message or the like, and transmits the Gate message or the like to the ONU 10. The control device 2 is a control device that controls transmission and reception processing on an OLT side based on a PON protocol. The control device 2 executes not only control of the PON protocol but also switching processing for redundant switching and synchronization processing for time information in the OLT 1.

The control device 2 includes, in relation to the synchronization processing, components such as a time-information extracting unit 21, a time-time stamp association processing unit 22 (hereinafter, association processing unit), and a message inserting unit 23. The time-information extracting unit 21 extracts, from an output signal of the PHY 7, time information received from a time information supply source of the grand master apparatus GM or the like and outputs the extracted time information to the association processing unit 22. The association processing unit 22 acquires time stamp information from the local clock 9, corrects the time information with respect to a value of an arbitrary time stamp $X_n$ taking a delay time into account, and outputs corrected time information ToDXn and the time stamp Xn to the message inserting unit 23. The message inserting unit 23 stores the time information ToDXn and the time stamp Xn in a TimeSync message and inserts the time information ToDXn and the time stamp Xn in a transmission signal input to the transmitter 52.

On the other hand, concerning the switching processing, the OLT 1 includes a failure detecting unit 24 and a switching control unit 25. The failure detecting unit 24 monitors a reception signal output from the receiver 51, detects a communication failure such as input signal interruption, and transmits a detection signal to the switching control unit 25. When a failure for which line switching is necessary occurs, based on the detection signal output by the failure detecting unit 24, the switching control unit 25 outputs a switching signal to the backup switching control unit 25 and the switch 8 and performs processing for stopping transmission by the OLTs of the OLT 1. Upon receiving the switching signal from the working switching control unit 25, the switching control unit 25 staying on standby as a standby switching control unit executes startup processing to cause all the OLTs of the OLT 1 to operate as working OLTs. The control device 2 functioning as a new working processing device takes over parameters and execution of the PON protocol from the original working control device 2 and continues a service for the ONU 10.

The master station apparatus shown in FIG. 4 includes the two OLTs having the same configuration. However, it is also possible to provide the control device 2, a buffer, and the like as devices shared by a plurality of lines and provide the receiver 51 and the transmitter 52 for each of the lines 30-1 and 30-2.

Figure 5:
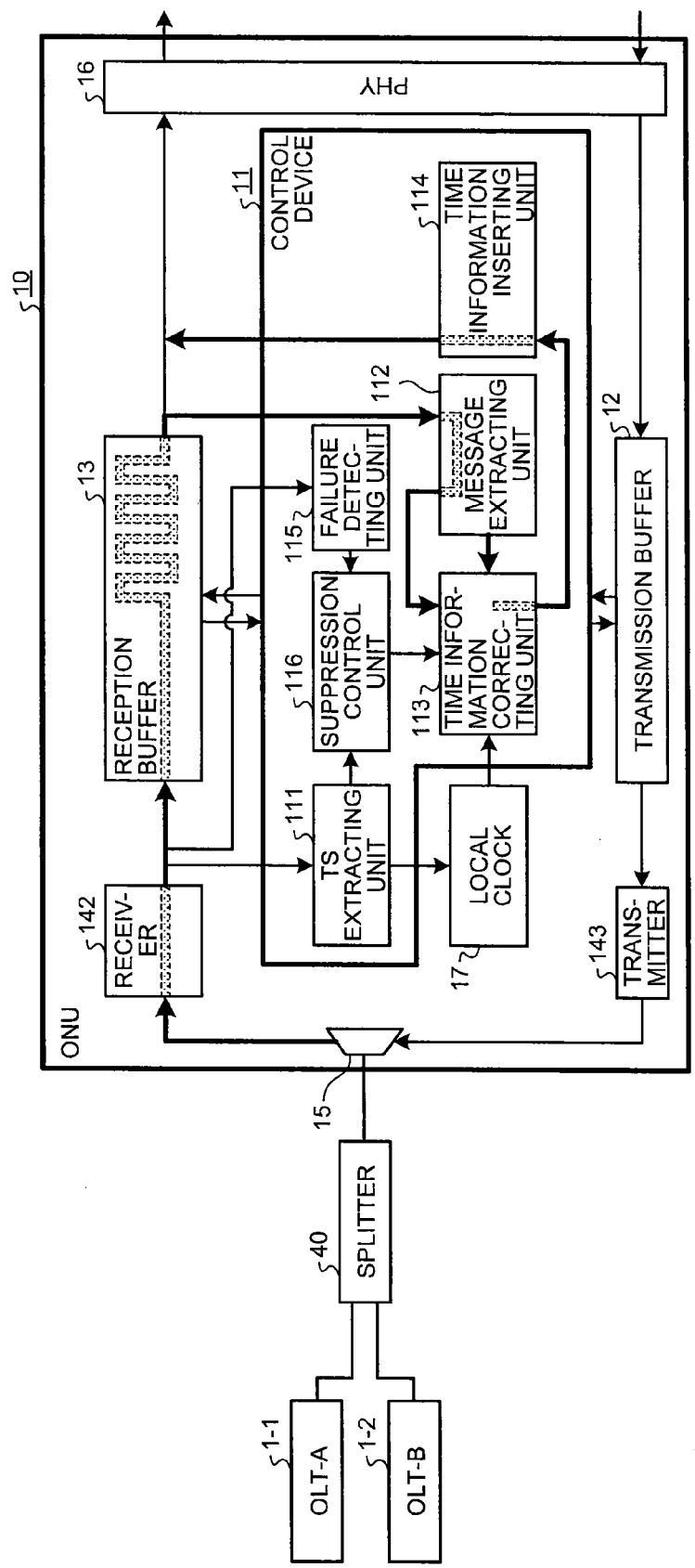
FIG. 5 is a configuration diagram of the configuration of a slave station apparatus in the second embodiment of the present invention.

FIG. 5 is a diagram of the ONU 10 in this embodiment. A WDM coupler 15 connected to the splitter 40 outputs a downlink optical signal to a receiver 142 and outputs an optical signal input from a transmitter 143 to the first network. The receiver 142 converts the optical signal into an electric signal and outputs the electric signal to a reception buffer 13 as reception data. The reception buffer 13 temporarily stores the data and outputs the data in response to an access by a physical-layer processing unit 16 and a control device 11. The physical-layer processing unit (PHY) 16 executes a physical interface function of an NNI (Network Node Interface) on a second network. A transmission buffer 12 is a buffer that temporarily stores reception data output by the PHY 16. The stored data is output to the control device 11 and the transmitter 143 based on the control by the control device 11. A local clock 17 supplies, in synchronization with the local clock 9 of the OLT 1, clock information (an MPCP counter) serving as a reference for transmission and reception timing of the ONU 10 to the control device 11.

The control device 11 is a control device that performs control of a PON protocol in the ONU 10. A time-stamp (TS) extracting unit 111 of the control device 11 extracts time stamp information transmitted by the OLT from reception data and synchronizes a local clock with a received time stamp. The ONU 10 can obtain accurate transmission timing according to local synchronization control on the first network. Therefore, a transmission signal of the ONU 10 and transmission signals of the other ONUs 10 do not collide with each other. It is possible to execute high-speed time division multiple access (TDMA) communication.

The control device 11 further includes a message extracting unit 112, a time-information correcting unit 113, and a time-information inserting unit 114 to execute the synchronization processing. Even when line switching is caused by a failure detecting unit 115 and a suppression control unit 116, the control device 11 can suppress propagation of an error of time information due to the line switching.

The message extracting unit 112 extracts a synchronization command (a TimeSync message) from reception data and outputs time information ToDXn and a time stamp Xn to the time-information correcting unit 113. The time-information correcting unit 113 corrects the time information ToDXn based on a difference between the received time stamp Xn and present time information S (MPCP counter) acquired from the local clock 17 of the ONU 10 and obtains present accurate time information. Subsequently, the time-information correcting unit 113 compensates for a processing delay or the like of the ONU 10, creates time information for transmission, and transmits the time information to the time-information inserting unit 114. The time-information inserting unit 114 creates a synchronization message (Sync message) in the second network using the received time information and transmits the synchronization message to the slave apparatus SL via the PHY 16.

The synchronization processing executed by the ONU 10 is processing executed in a layer higher than update processing for the local clock 17 executed in an MPCP layer. Therefore, it takes time until the synchronization processing is actually started as explained above. It is likely that update of the local clock 17 is performed earlier than the synchronization processing based on a time stamp value received after the TimeSync message. Therefore, after receiving the TimeSync message, when the ONU 10 receives a new time stamp via a line after switching, an error occurs in time information corrected based on the new time stamp. One error factor is a delay time that is different depending on a communication path. Another error factor is a difference between time stamp values of the two OLTs 1-1 and 1-2 when the OLTs 1-1 and 1-2 respectively have the local clocks 9.

The control device 11 includes the suppression control unit 116 to suppress propagation of such an error. When the failure detecting unit 115 detects a communication failure, the suppression control unit 116 causes, based on a result of the detection, the time-information correcting unit 113 to stop information correction and causes the time-information inserting unit 114 to stop the transmission of the synchronization message. According to this suppression processing, it is possible to suppress time information including an error from being transmitted to the slave apparatus SL.

(1) Control Details of the Slave Station Apparatus

Figure 6:
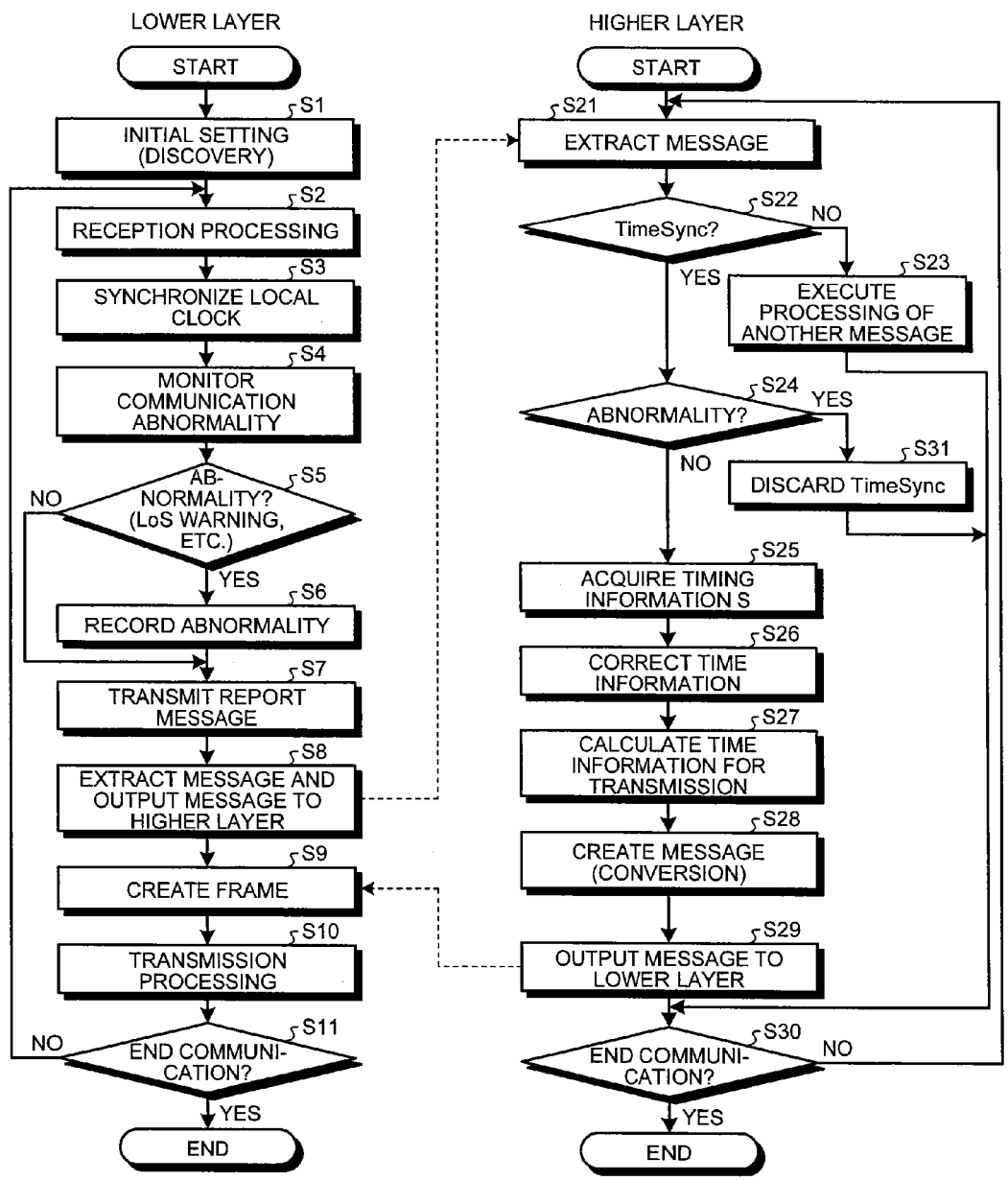
FIG. 6 is a flowchart for explaining processing by a control device of the slave station apparatus in the second embodiment of the present invention.

FIG. 6 is a flowchart for explaining processing by the control device in the slave station apparatus (ONU) 10 in this embodiment. The processing can be realized by software or can be executed using hardware by a dedicated circuit. Control shown in FIG. 6 is divided into control by a lower layer such as control of frame processing and transmission and reception timing and a control by a higher layer for performing time synchronization using a communication function of the lower layer. The lower layer is a lower sub-layer for MAC (Media Access Control) control. The higher layer is a layer including OSSP (Organization-Specific Slow Protocol) and MD (Media Dependent) layers higher than the MAC control layer.

First, control by the lower layer is explained. When started up, the control device 11 performs initial setting through discovery processing (step S1) and establishes a link to the OLT 1 and starts communication through the discovery processing or the like. A signal arrived via the first network is received by reception processing and stored in a reception buffer (step S2). Subsequently, the control device 11 performs synchronization processing for the local clock 17 (step S3). When time stamp information is included in the reception signal, the control device 11 changes a value of the local clock 17 according to a time stamp extracted from the reception signal. The local clock 17 is an increment counter that counts up a 32-bit counter value periodically (every 16 ns). The value of the local clock 17 of the ONU 10 has to be synchronized with the local clock 9 of the OLT 1 at high precision. Therefore, an accumulated error of a slight shift of count periods of the local clocks is regularly or irregularly corrected by synchronization processing for the local clocks using the time stamp.

Subsequently, the control device 11 monitors occurrence of a communication abnormality based on the reception signal (step S4). The failure detecting unit 115 performs the monitoring of a communication abnormality. For example, when the receiver 142 does not detect an optical signal for a fixed time, the failure detecting unit 115 recognizes that some abnormality occurs in the first network and outputs abnormality occurrence of Optical LoS as a monitoring result. As the communication abnormality, besides the Optical LoS, there are, for example, MAC LoS that occurs when non-reception is detected at a MAC level and a time stamp drift error detected when a difference between a received time stamp and time (local time) information measured by the ONU 10 is equal to or larger than a predetermined threshold. A communication failure detected by the failure detecting unit 115 is a communication failure that causes redundant switching. An appropriate failure detecting method should be selected according to a redundant switching condition.

When no abnormality occurs, the control device 11 shifts to processing at step S7. When an abnormality is detected, the control device 11 shifts to processing at step S6 (step S5). At step S6, the control device 11 records the occurrence of the abnormality in a memory or the like. At this point, the control device 11 can immediately output the occurrence of the abnormality to a higher layer. Although not described in the flowchart of FIG. 6, when a communication abnormality occurs, other error control determined by the PON protocol or the like is also performed.

Upon receiving a Gate message from the OLT 1, the control device 11 transmits a Report message via the transmitter 143 (step S7). The Report message is a band request signal and has a parameter of a requested band such as a data amount accumulated in a transmission buffer. Because the OLT 1 measures an RTT, the control device 11 records information concerning a time stamp during the transmission acquired from the local clock 17 in the Report message and transmits the Report message to the OLT 1.

Subsequently, the control device 11 extracts a message from reception data stored in the reception buffer 13 and transmits the message to the higher layer (step S8). TimeSync, which is a synchronization command, is included in the message. The control device 11 creates a transmission frame and stores transmission data acquired from the higher layer in the transmission frame (step S9). A Sync message is included in the transmission data. As the transmission and reception, there are transmission and reception to and from the first network and transmission and reception to and from the second network. Therefore, the control device 11 executes both the kinds of transmission and reception using respective protocols and data formats for the transmission and reception.

Subsequently, the control device 11 transmits the created frame (step S10). When continuing the communication ("No" at step S11), the control device 11 continues the transmission and reception processing from step S2.

Subsequently, synchronization control for time information by the higher layer is explained. Control by the higher layer is executed in parallel to control by the lower layer. The higher layer exchanges data and messages with the lower layer, whereby cooperated control is executed. Upon extracting an unprocessed message from an output of the lower layer (step S21), the control device 11 determines whether the message is a synchronization command (TimeSync) (step S22). When the message is another message, the control device 11 performs operation corresponding to a type of the message (step S23). When the message is TimeSync, the control device 11 executes synchronization control at step S24 and subsequent steps.

At step S24, the control device 11 determines whether a communication abnormality is detected. When the control device 11 determines that all conditions for detection of a communication abnormality are not met, the control device 11 starts execution of processing at step S25 and acquires timing information S (i.e., present time stamp information) from the local clock 17. Subsequently, the control device 11 performs processing for correcting time information ToDx, i of the TimeSync message (step S26). For the correction of the time information, any method can be adopted as long as a difference between the time information and present time due to a delay time can be corrected using time stamp information. As an example of time information ToD after the correction, a calculation described below can be used.

$$Tod = ToD_{X,i} + [(S-X) \bmod (2^{32})](16 \text{ ns}) \cdot \text{rateRatio}$$

In the formula,
mod represents a modulus operation
(16 ns) represents 16 nanoseconds
ToDX, i: time information of the TimeSync message
X: time stamp information of the TimeSync message
i: an identification number of a clock slave (ONU)
S: time stamp information of a local clock of the ONU
rateRatio: a ratio of a time period of the grand master apparatus GM to a time period of the local clock Accurate time information can be obtained as well by, without using the above formula, setting ToDX, i as present time information when the local clock 17 indicates a value of a time stamp X. In this case, the OLT 1 has to set the time stamp X at timing after reception timing of the ONU 10 and calculate, according to the time stamp X, the time information ToDX, i to indicate accurate time at the timing X.

Subsequently, the control device 11 further adds a delay time of processing and an internal delay time in transmission processing to the second network to the corrected time information ToD and creates time information for transmission (step S27). Further, the control device 11 creates a Sync message of the second network and stores the created time information for transmission in the Sync message (step S28). The created Sync message is output to the lower layer (step S29) and transmitted to the second network by the transmission processing at step S10.

On the other hand, when it is determined at step S24 that a communication abnormality occurs, the control device 11 discards the TimeSync message (step S31) and shifts to processing at step S30. The correction of the local clock of the lower layer at step S3 is executed at high speed and frequently every time when a message of the MPCP is received. Therefore, it is likely that, immediately before time synchronization processing is executed by the higher layer, a time stamp indicated by the local clock is changed to a time stamp after line switching. When the control device 11 detects a factor of occurrence of redundant switching, the control device 11 stops the output of the time information. Therefore, it is possible to prevent wrong time information from being transmitted to the slave apparatus SL.

At step S30, the control device 11 determines whether the communication is continued. When the communication is continued, the control device 11 repeatedly executes the processing explained above.

(2) Control Details of the Master Station Apparatus

Figure 7:
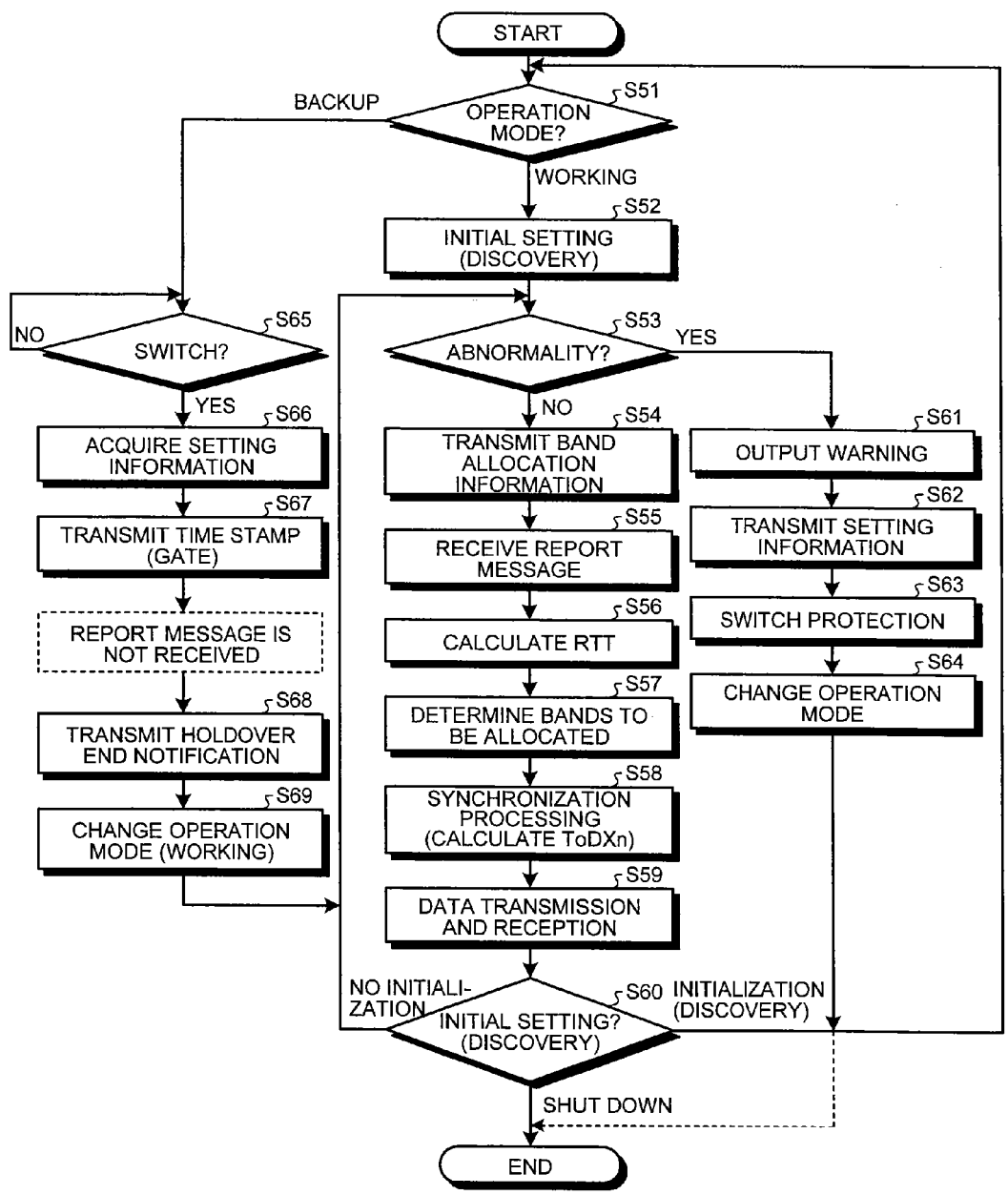
FIG. 7 is a flowchart for explaining processing by a control device of the master station apparatus in the second embodiment of the present invention.

FIG. 7 is a flowchart for explaining processing executed by the control device 2 of the OLT 1. When started up, the control device 2 determines whether the operation of the OLT 1 is a working mode or a backup mode (step S51). When the operation is not the working mode, the control device 2 shifts to processing at step S65 and stays on standby as the backup control device 2 until the mode is switched.

Operation in the Working Mode (Normal Time)

When the operation mode is the working mode, the control device 2 starts discovery processing (step S52). When establishment of a logical link and registration of the ONU 10 by the discovery processing are completed, the control device 2 performs detection of a line abnormality (step S53).

When no line abnormality occurs, the control device 2 notifies the ONUs 10 of band allocation information using a Gate message (step S54) and receives Report messages from the ONUs 10 (step S55). Subsequently, the control device 2 calculates RTTs of the ONUs based on time stamps included in Reports (step S56) and determines, based on requested band information of the Reports and the RTTs, transmission bands to be allocated to the ONUs 10 (step S57).

When the control device 2 has received a Sync message from the grand master apparatus GM, the control device 2 executes synchronization processing and calculates the time information ToDXn (step S58). The calculated time information ToDXn is stored in a synchronization command (a Sync-Time message) together with the time stamp information Xn and transmitted to the slave station apparatus 10 in the next processing of data transmission and reception.

In parallel to the processing explained above, the control device 2 performs transmission and reception of data at the present band update period (step S59). Subsequently, the control device 2 determines whether the discovery processing is necessary (step S60). When the discover processing is unnecessary, the control device 2 proceeds to step S53. When the discovery processing is necessary, the control device 2 returns to step S51. To discover the ONU 10 connected anew or the ONU 10 started up anew, the discovery processing is regularly executed. When it is necessary to shut down the OLT, the control device 2 ends the processing at this point.

Operation in the Working Mode (During a Switching Operation)

When the control device 2 detects a line abnormality at step S53, the control device 2 performs warning output processing at step S61. Subsequently, the control device 2 transmits setting information of the ONUs 10 to a backup OLT (step S62). When the setting information is already shared with the backup OLT, the control device 2 does not have to transmit the information again.

Subsequently, the control device 2 executes line switching processing (protection switching processing) (step S63). When performing line switching, the control device 2 transmits a switching instruction signal to the backup OLT and stops transmission of a control message to the ONU 10. When the line switching processing ends, thereafter, the control device 2 rewrites operation mode information to "backup" (step S64), returns to step S51, and starts the operation of the backup control device 2. When the line abnormality is an unrecoverable abnormality or when it is necessary to shut down the control device 2, for example, during forced switching, the control device 2 does not shift to the operation of the backup control device 2 and performs shutdown of the control device 2 and ends the processing.

Operation in the Backup Mode

The operation of the control device 2 performed when the operation mode is the backup mode is explained. At step S65, the control device 2 monitors whether line switching is necessary and stays on standby until the line switching becomes necessary. The control device 2 executes the line switching, for example, when the control device 2 receives a switching instruction signal from the working OLT or when the control device 2 monitors the operation of the working OLT and determines that an abnormality occurs. When performing switching, the control device 2 of the backup OLT transmits a signal for notifying that the switching is performed to the working OLT and the switch 8. Thereafter, the switch 8, which receives this switching instruction signal, switches connection to the network to the backup OLT side.

Subsequently, the control device 2 acquires setting information from the working OLT (step S66) and transmits a Gate message including a time stamp to the ONUs 10 using the setting information (step S67). In the PON protection system, the splitter 40 relays an uplink signal from the ONU 10 to both the working and backup lines 30-1 and 30-2. Therefore, even when the control device 2 of the backup OLT is operating as the backup control device 2, the control device 2 can receive a signal from the ONU 10. Therefore, when the control device 2 is in the standby state at step S65, the control device 2 can always monitor setting information included in the uplink signal and acquire the setting information in advance.

The ONU 10 in a holdover period does not transmit an uplink signal. Therefore, a Report responding to a Gate is not transmitted to the control device 2. Therefore, the control device 2 can transmit, without waiting for reception of the Report, a control message for instructing holdover completion (step S68). The control device 2 can notify the Gate and the holdover completion with one control message as well. As a control message for synchronizing with the ONU 10, the control device 2 can use a control message other than the Gate as well.

The control device 2, which transmits the holdover end notification, rewrites the operation mode information to working operation mode information and thereafter operates as the working control device 2 (step S69). When starting operation of the working control device 2 after the line switching, because the control device 2 resumes the communication using setting information taken over from the working OLT, the discovery processing (step S52) can be omitted. Therefore, an interruption time of communication decreases.

In the synchronization processing at step S58, the control device 2 calculates time information as explained below. The time information is a synchronization time obtained when an MPCP counter of a local clock indicates [X-(predetermined delay time in the ONU 10)] in an ith ONU among a plurality of ONUs 10.

$$Tod_{X,i} = Tod_{X,0} + RTT_i \cdot \frac{n_{down}}{n_{up} + n_{down}} \cdot rateRatio$$

In the formula,
X: an MPCP counter
ToDx, 0: the MPCP counter in the OLT+a predetermined delay time in the OLT
RTTi: a round trip time to an ONUi
ndown: an effective refractive index of light of a downstream channel nup: an effective refractive index of light of an upstream channel The predetermined delay time in the ONU is called onu-LatencyFactor and the predetermined delay time in the OLT is called oltLatencyFactor.

Third Embodiment

In the second embodiment, the slave station apparatus 10 performs the processing for suppressing an output of a synchronization message when it is likely that an error occurs in the time synchronization processing according to the line switching. An embodiment in which the slave station apparatus 10 performs protection of the local clock and executes the synchronization processing while suppressing occurrence of an error is explained.

Figure 8:
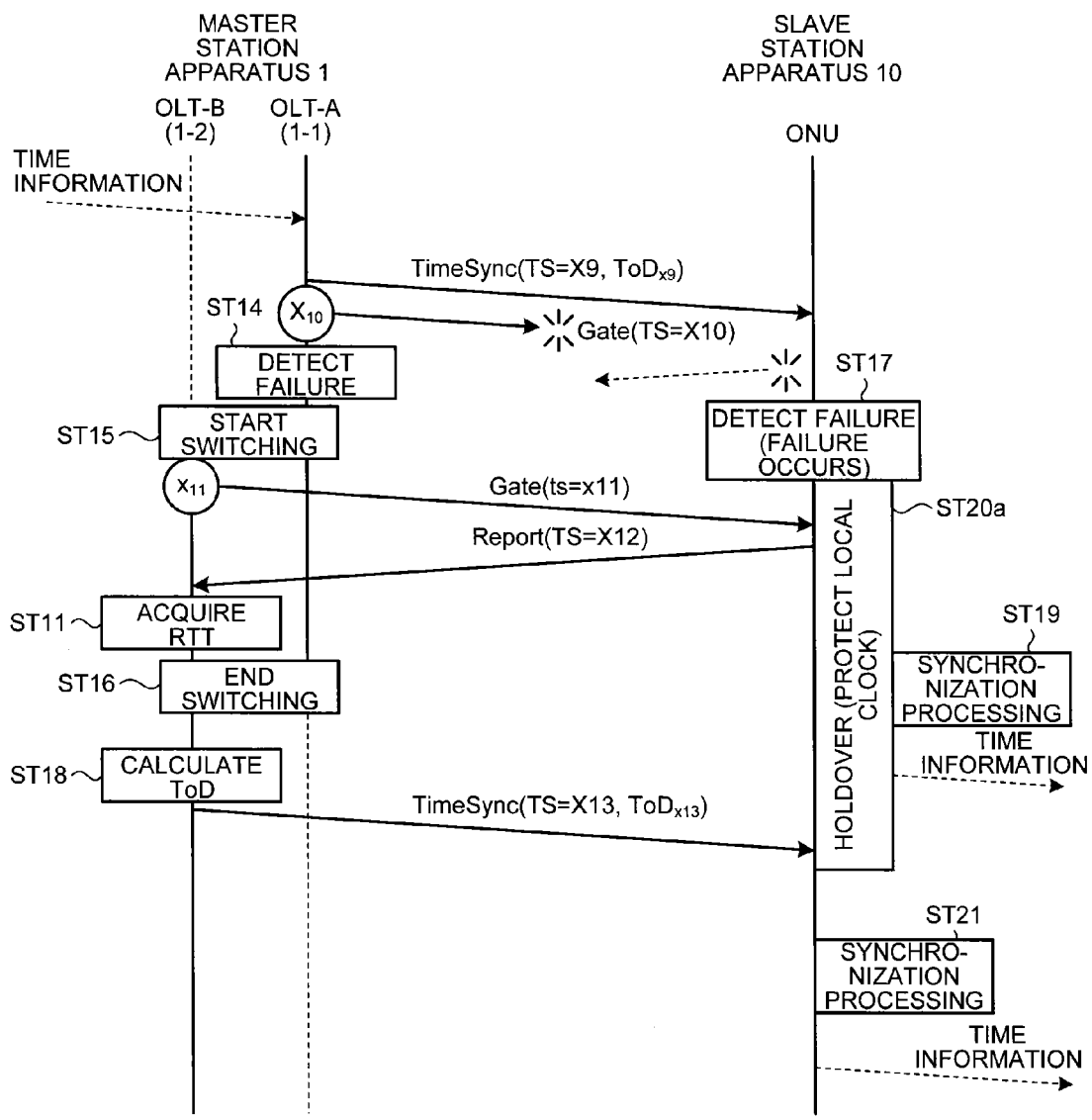
FIG. 8 is a sequence chart for explaining time synchronization control in a third embodiment of the present invention.

FIG. 8 shows a time synchronization sequence of a communication system in a third embodiment. In FIG. 8, reference signs same as the reference signs in FIG. 2 or 3 represent the same or equivalent processing. When the slave station apparatus (the ONU) 10 detects a communication failure at step ST17, the slave station apparatus 10 temporarily shifts to a holdover state at step ST20a and protects a local clock before line switching. Even if the slave station apparatus 10 receives a time stamp from the master station apparatus (the OLT-B) 1 after the line switching, the slave station apparatus 10 continues measurement of local clock information used in a line before switching and operates to prevent an error in synchronization processing due to update of the local clock.

When the synchronization processing is started, the slave station apparatus 10 calculates the time information ToD in the same manner as explained above based on the protected local clock (step ST18). The protected local clock is synchronized with the local clock of the master station apparatus 1 before switching. Therefore, the slave station apparatus 10 can transmit correct time information ToD to the second network as usual without causing a large error.

When the slave station apparatus 10 shifts from the holdover state to a normal state, the slave station apparatus 10 releases the protection of the local clock and resumes the correction of the local clock based on a time stamp transmitted from the master station apparatus 1 after the line switching.

Figure 9:
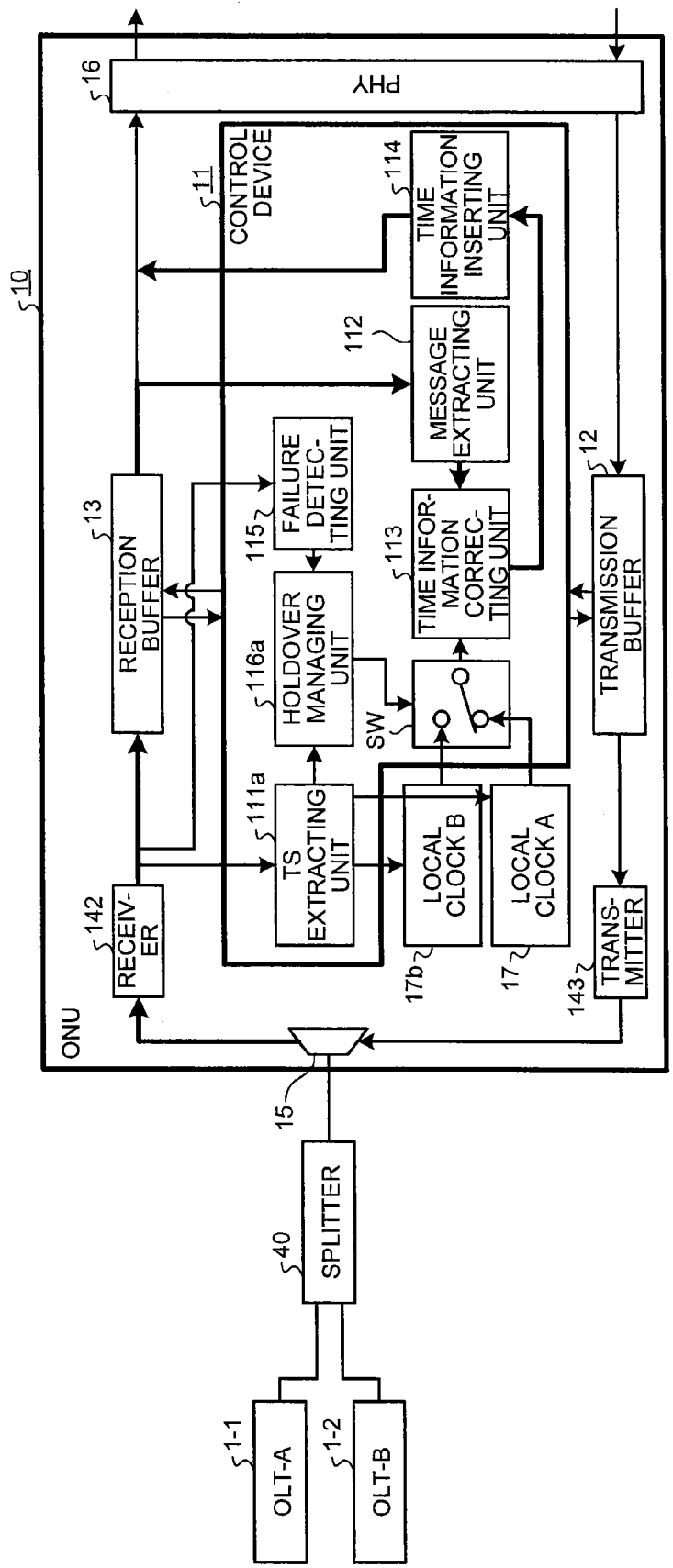
FIG. 9 is a configuration diagram of the configuration of a slave station apparatus in the third embodiment of the present invention.

As end conditions for the holdover state, there are end conditions described below. Any of the end conditions can be adopted.
(1) Whether a period set in advance ends after a communication abnormality is detected
(2) Completion of redundant switching
(3) Reception of a new TimeSync message As an example of the slave station apparatus 10 that protects the local clock, an example of an ONU and a control device of the ONU is explained. FIG. 9 shows the slave station apparatus 10 including two local clocks 17 and 17b. In FIG. 9, reference numerals same as the reference numerals in FIG. 5 represent the same or equivalent sections. The local clock 17b is a backup local clock for protecting the local clock before line switching. At normal time, the local clock 17b operates the same as a local clock A 17. (A TS extracting unit 111a of) the control device 11 corrects a backup local clock B 17b using a received time stamp. A holdover managing unit 116a is control unit for controlling, when the failure detecting unit 115 detects a failure, a switch (switching unit) sw and performing control for switching a local clock used by the time-information correcting unit 113 to correct time information.

Figure 10:
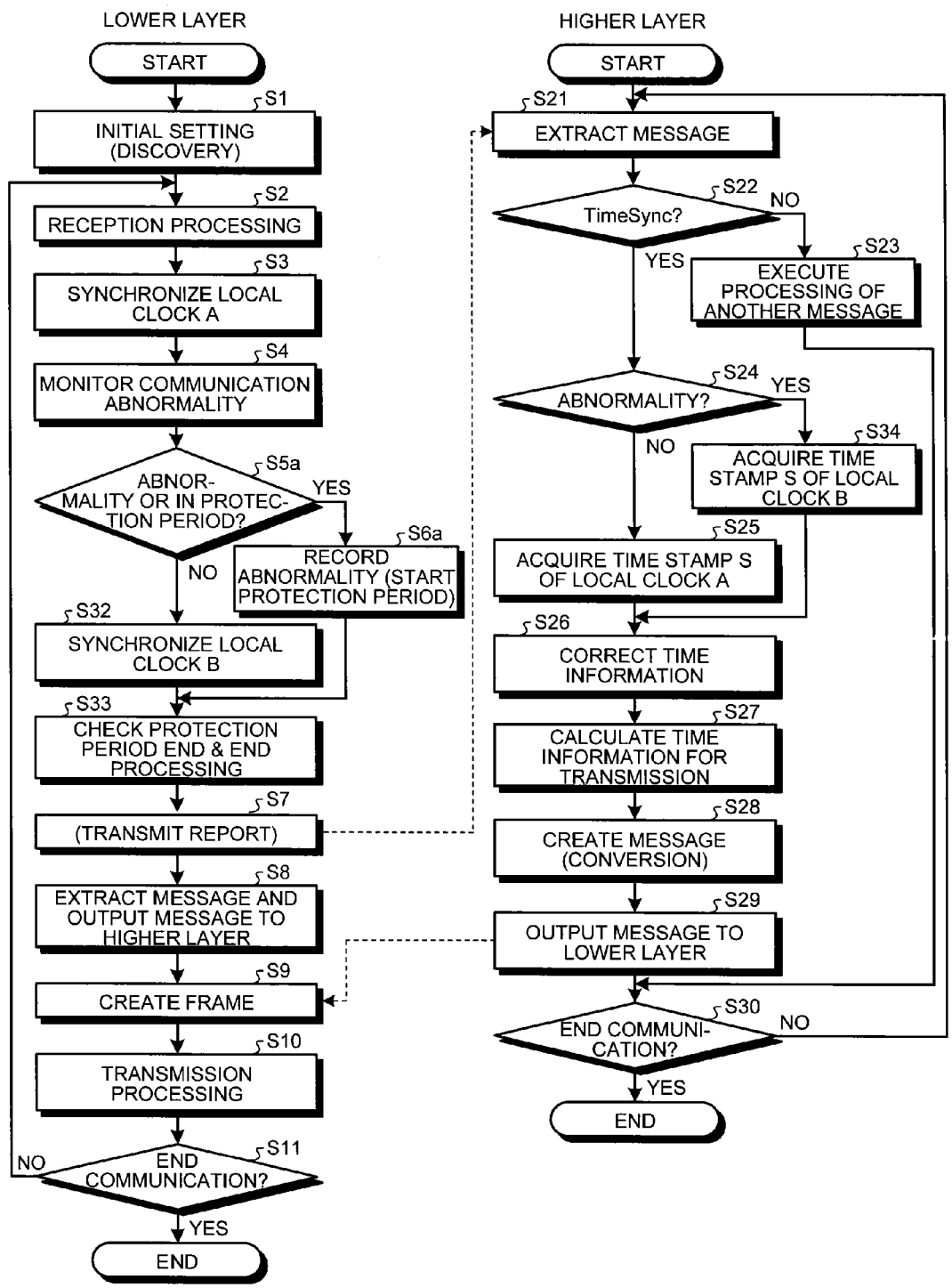
FIG. 10 is a flowchart for explaining processing by a control device of the slave station apparatus in the third embodiment of the present invention.

FIG. 10 is a flowchart for explaining control executed by a control device of the ONU 10. In FIG. 10, reference signs same as the reference signs in FIG. 6 represent the same or equivalent processing. Synchronization processing for a time stamp in a lower layer is different according to whether an abnormality is detected (or the control device 11 is in a protection period) or an abnormality is not detected (and the control device 11 is not in the protection period). If an abnormality is not detected and the control device 11 is not in the protection period, the control device 11 corrects the local clock B 17b, i.e., performs the synchronization processing based on a received time stamp (step S32).

This correction is the same as the correction of the local clock A 17 (step S3). However, in the correction at step S32, the control device 11 needs to compensate for a delay time until execution of correction after reception of a time stamp. The control device 11 can execute the correction according to a method of setting a time stamp value of the local clock A 17 in the local clock B 17b.

On the other hand, when an abnormality is detected or during the protection period, the control device 11 records the detected abnormality in processing at step S6a as at step S6 in FIG. 6 and notifies the higher layer of the abnormality. The control device 11 does not need to execute a recording and a notification of the abnormality that are already recorded or notified. The control device 11 stores, in a memory or the like, the start of the protection period and the shift to the holdover state. According to this processing, because correction by a time stamp of the local clock B 17b is skipped in the holdover state, the local clock B 17b can continue measurement of time set before the line switching. Therefore, time (an MPCP counter) based on the local clock before switching is protected.

Subsequently, the control device 11 checks whether the protection period ends. When the protection period ends, the control device 11 ends the protection of the local clock and shifts from the holdover state to the normal state (step S33). According to this processing, the information indicating that the control device 11 is in the protection period (or the holdover state) and stored at step S6a is cleared. When the control device 11 executes step S5a next, synchronization processing for the local clock B 17b is executed at step S32. When the protection period does not end, no processing is performed.

The local clock A 17 is timing information necessary for an MPCP. Therefore, the local clock A 17 is corrected based on a received time stamp even in the holdover state. As shown in FIG. 1, the ONU 10 is connected to the OLT 1 by one branch line 31. The ONU 10 finally receives the time stamp through the one branch line 31 irrespective of whether the time stamp is transmitted through the line 30-1 or the line 30-2 on a trunk line side. In the holdover state, when a value of the local clock A 17 is substantially different from time stamp information received after the line switching, a detection condition for a time stamp drift error is met. However, to prevent resetting of a link, in the holdover state, the control device 11 controls the ONU 10 not to shift to an unregistered state even if the detection condition for the time stamp drift error is met.

The operation of the higher layer is explained. Upon determining at step S24 that an abnormality is detected, the control device 11 executes the processing at step S34. At step S34, the control device 11 acquires a time stamp S of the local clock B 17b instead of a time stamp of the local clock A 17 and uses the time stamp S for the correction of the time information at step S26 (equivalent to the function of the switch sw by the control by the holdover managing unit 116a in FIG. 9).

Figure 11:
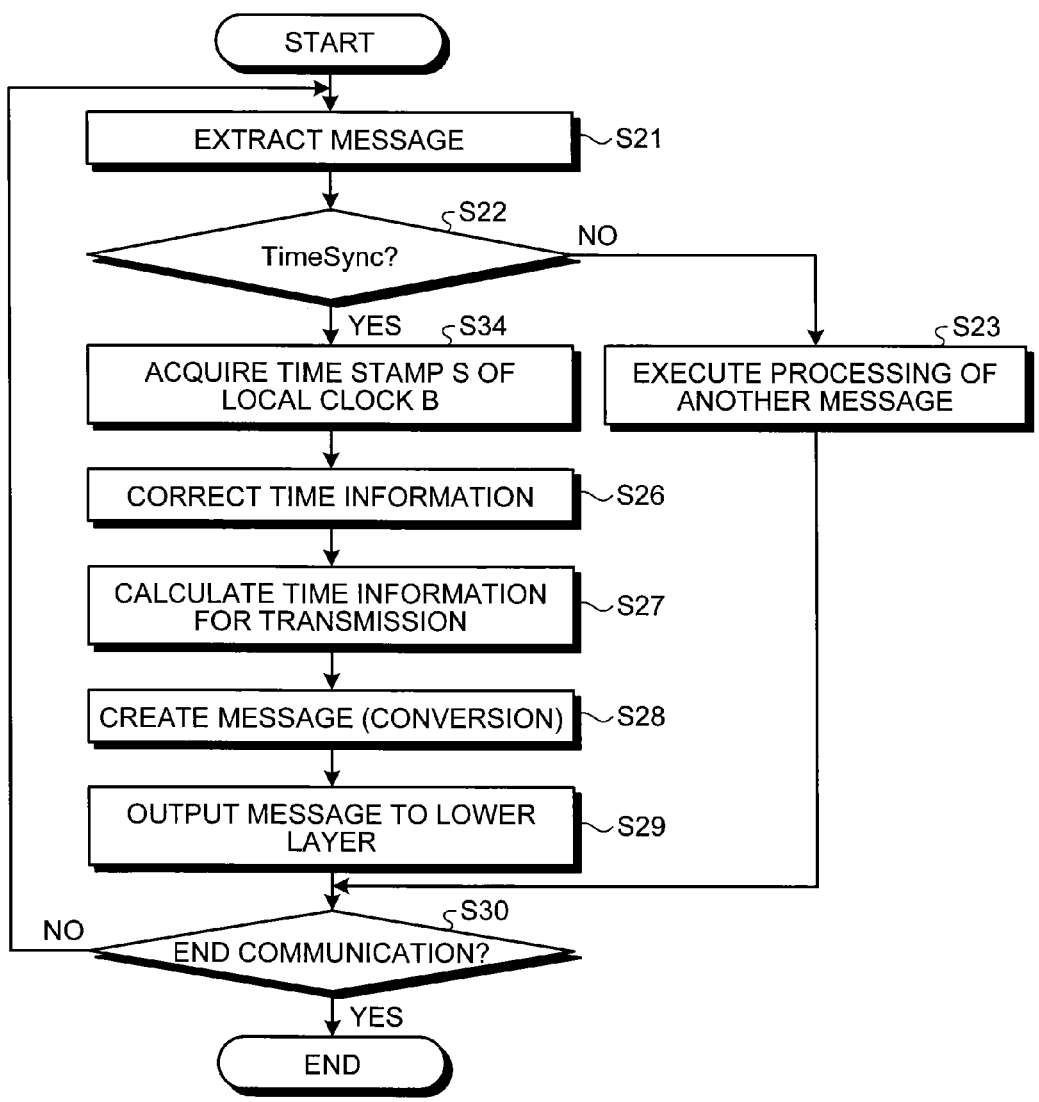
FIG. 11 is another flowchart for explaining the processing by the control device of the slave station apparatus in the third embodiment of the present invention.

The local clock B 17b is synchronized with the local clock A 17 according to the processing at step S32 by the lower layer in FIG. 10. Therefore, as shown in the flowchart of FIG. 11, it is also possible to always perform the correction processing for the time information of the higher layer (step S27) based on the local clock B 17*b*.

As explained above, according to this embodiment, the local clock is protected during the line switching and a correction error of the time information due to fluctuation in the local clock is effectively suppressed. Therefore, the slave station apparatus 10 can supply accurate time to the second network. Compared with the second embodiment, the slave station apparatus 10 in this embodiment has a characteristic that the slave station apparatus 10 can stably relay a time synchronization message without discarding the TimeSync message.

Fourth Embodiment

In the communication system in the third embodiment, the local clock before switching is protected during the line switching and the correction of the time information is performed based on the protected local clock. In an embodiment explained below, it is possible to discriminate through which of line systems the slave station apparatus 10 receives a time stamp and perform correction of time information corresponding to the line through which the time stamp is received.

Figure 12:
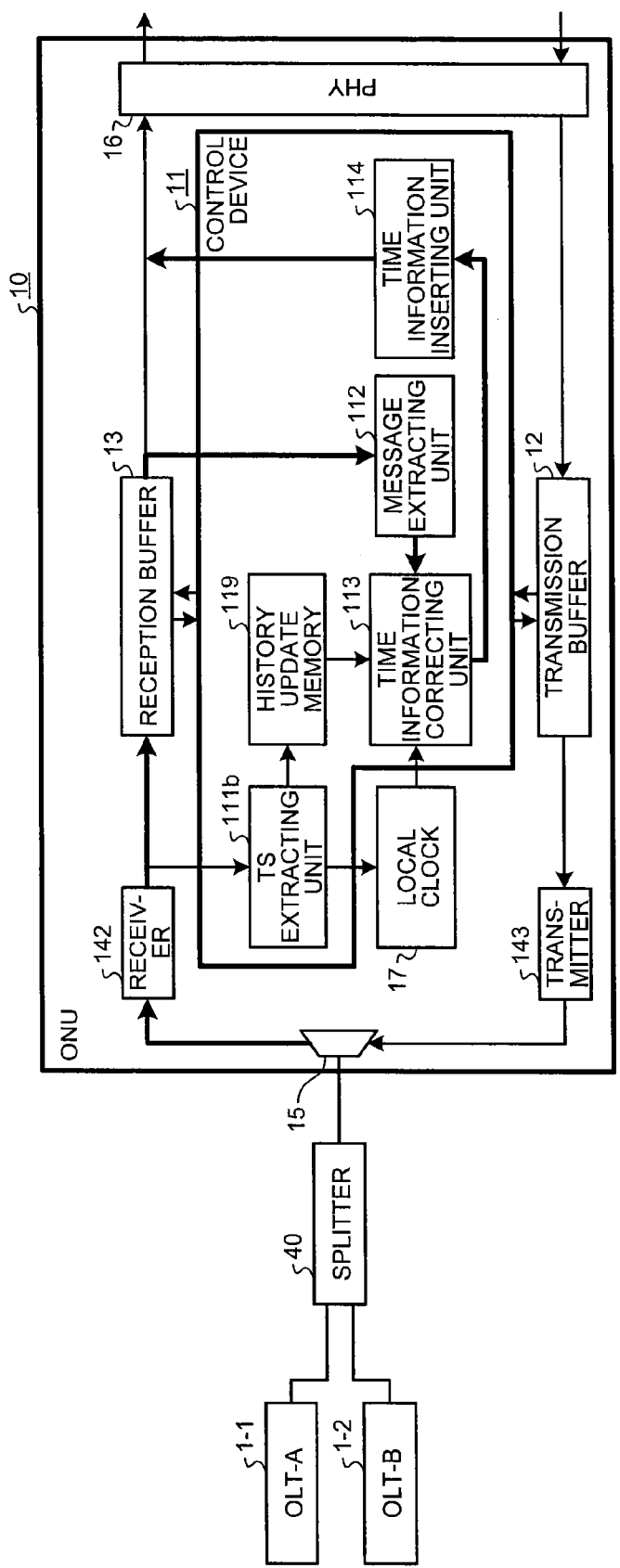
FIG. 12 is a configuration diagram of the configuration of a slave station apparatus according to a fourth embodiment of the present invention.

FIG. 12 shows the slave station apparatus (the ONU) 10 in this embodiment. In FIG. 12, reference numerals same as the reference numerals in FIG. 5 or 9 represent the same or equivalent sections. A time-stamp (TS) extracting unit 111*b* has a function same as the function of the TS extracting unit 111 shown in FIG. 5 and further has a history updating function for discriminating from which of the OLTs 1-1 and 1-2 (through which of the lines 30-1 and 30-2) a received time stamp is sent and recording a result of the discrimination in a history update memory 119.

A transmission source of the time stamp can be discriminated according to a source address included in an MPCPDU (Multi-Point Control Protocol Data Unit) signal. For example, a Gate message is transmitted to the slave station apparatus 10 using an MPCPDU. When the Gate message is transmitted, the OLTs 1-1 and 1-2 of the master station apparatus 1 designate a MAC address of the slave station apparatus 10 as a destination address, designate a MAC address of the master station apparatus 1 as a source address, and store information concerning these addresses in the MPCPDU together with the time stamp. The TS extracting unit 111*b* of the ONU 10 extracts time stamp information from a reception signal. When the local clock 17 is corrected, the TS extracting unit 111*b* stores, based on the source address of the MPCPDU, in the history update memory 119, whether the correction is performed according to a time stamp transmitted from the OLT 1-1 or a time stamp transmitted from the OLT 1-2.

Figure 13:
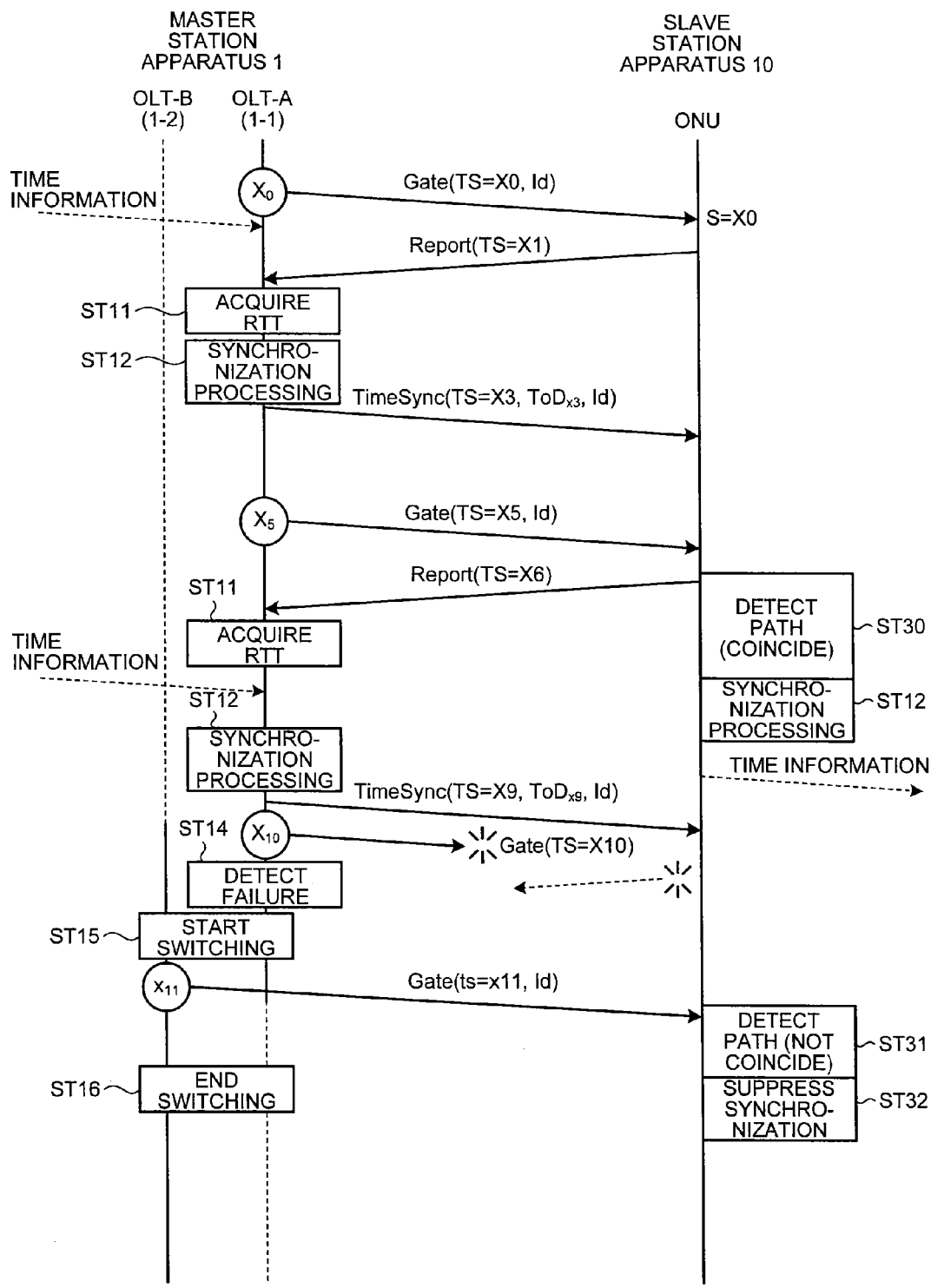
FIG. 13 is a sequence chart for explaining time synchronization control in the fourth embodiment of the present invention.

A sequence of time synchronization is explained. FIG. 13 shows the time sequence. In FIG. 13, reference signs same as the reference signs in FIG. 3 or 8 represent the same or equivalent processing. The OLT 1-1 inserts, in a synchronization command (TimeSync), an identifier Id that can identify an OLT such as a source address (a MAC address) or identifiers that can identify the lines 30-1 and 30-2 and transmits the synchronization command to the ONU 10. The ONU 10 stores the identifier Id.

When starting execution of synchronization processing, the ONU 10 accesses the history update memory 119 and checks a latest history update. The ONU 10 compares Id recorded in the history and the identifier Id designated in the synchronization command (step ST30). If Id and the identifier Id coincide with each other, the ONU 10 executes the synchronization processing (step ST14). Conversely, at step ST31, when the time stamp is updated by the other OLT 1-2 immediately before the step, because the identifier Id recorded in the history update memory 119 is Id of the other OLT 1-2, the ONU 10 detects that Id does not coincide with the identifier Id of the synchronization command (step ST31). Upon detecting that the identifiers do not coincide with each other, the ONU 10 suppresses the synchronization processing based on the synchronization command and does not transmit time information (step ST32).

Figure 14:
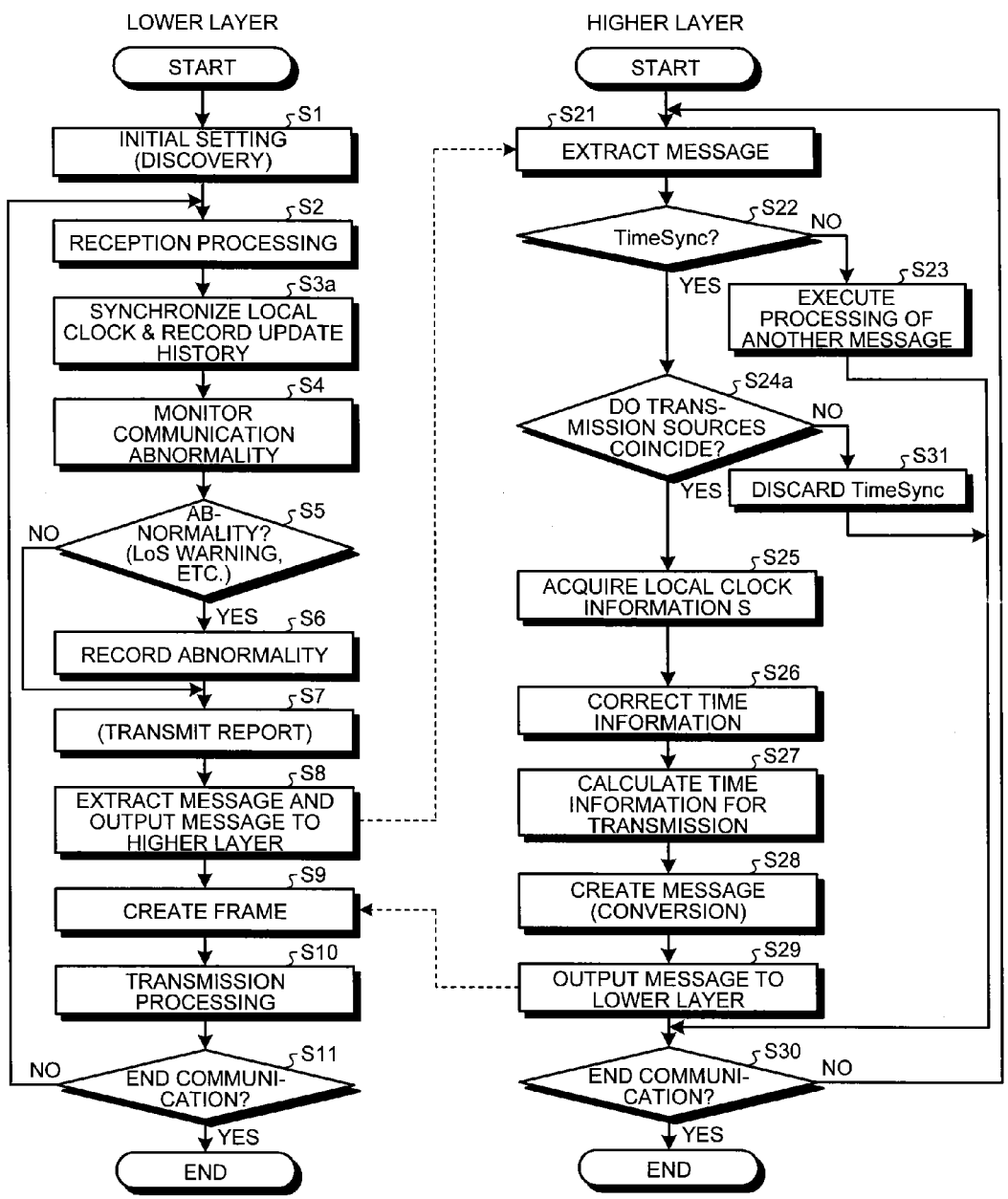
FIG. 14 is another a flowchart for explaining processing by a control device of the slave station apparatus in the fourth embodiment of the present invention.

FIG. 14 is a flowchart for explaining processing by the control device in this embodiment. In FIG. 14, reference signs same as the reference signs in FIG. 6 or 10 represent the same or equivalent processing. As indicated by step S3*a*, the control device 11 performs synchronization of the local clock 17 in a lower layer and records information concerning a supply source of a time stamp used for the synchronization in the history update memory 119.

On the other hand, in a higher layer, at step S24*a*, the control device 11 discriminates whether the transmission source identifier Id of the synchronization command and the information concerning the transmission source of the time stamp recorded in the history update memory coincide with each other. When the transmission source identifier Id and the information concerning the transmission source of the time stamp do not coincide with each other, the control device 11 discards the synchronization commend (the TimeSync message) (step S31). When the transmission source identifier Id and the information concerning the transmission source of the time stamp coincide with each other, the control device 11 performs correction of the time information (step S26).

As explained above, in this embodiment, the control device discriminates, based on the line switching, according to the information concerning the transmission source, whether inconsistency occurs between the local clock and the synchronization command. When the inconsistency occurs, the control device refrains from transmitting the time information to the second network. Therefore, it is possible to effectively suppress occurrence of an error.

Fifth Embodiment

A communication system is explained in which the master station apparatus 1 can notify the slave station apparatus 10 of a difference in a time stamp involved in line switching and the slave station apparatus 10 can correctly execute time synchronization processing using information concerning the difference.

Figure 15:
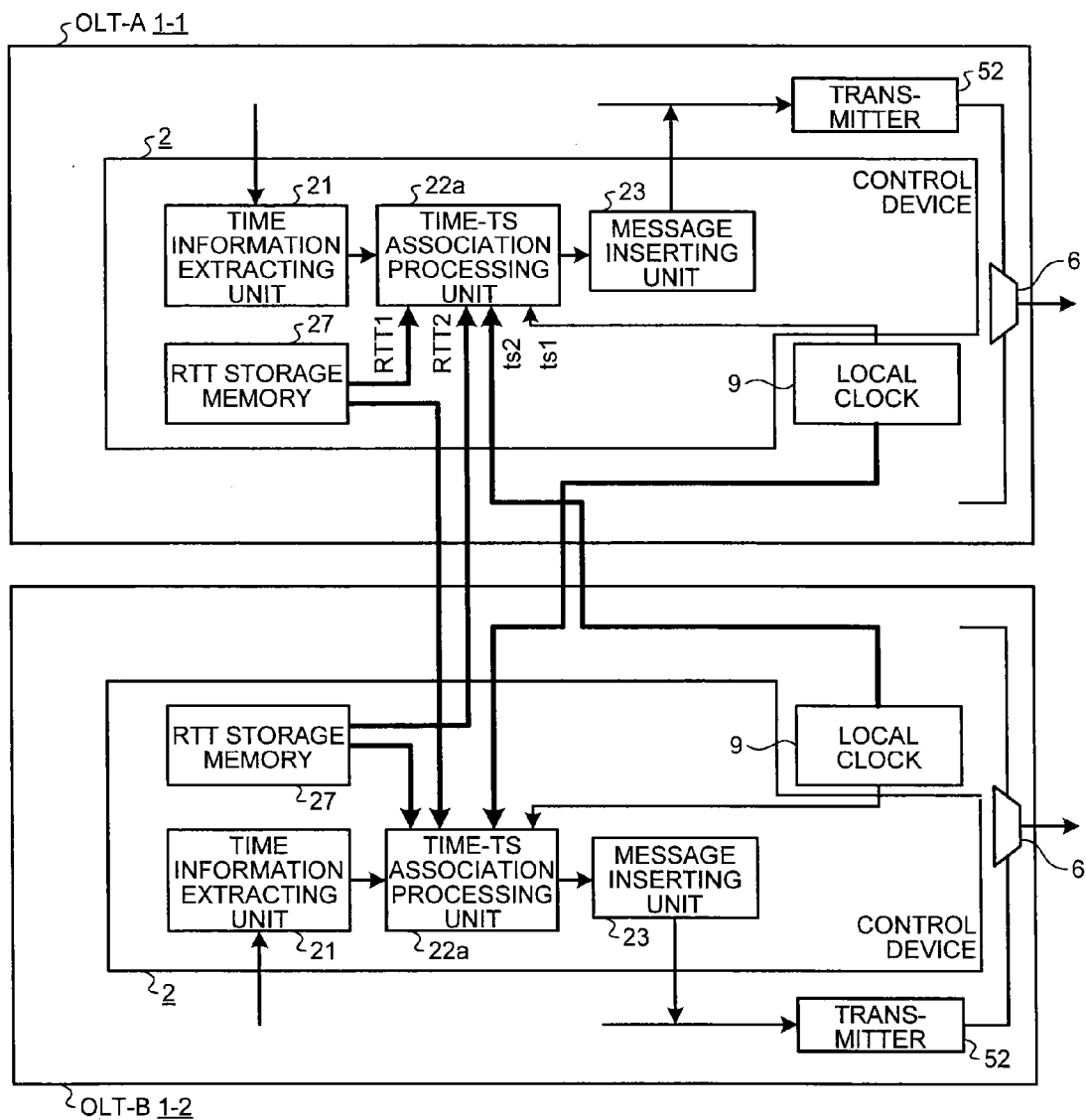
FIG. 15 is a configuration diagram of a partial configuration of a master station apparatus in a fifth embodiment of the present invention.

FIG. 15 shows the master station apparatus 1 in this embodiment. In FIG. 15, reference numerals same as the reference numerals in FIG. 4 represent the same or equivalent components. In FIG. 15, functional components concerning time synchronization among the components shown in FIG. 4 are extracted and shown and the other components are omitted. However, the master station apparatus includes the other components as in FIG. 4.

The OLTs 1-1 and 1-2 shown in FIG. 15 include time-stamp (TS) association processing units 22*a* (hereinafter referred to as association processing units 22*a*) configured to acquire not only time stamp information of the local clocks 9 of the OLTs but also time stamp information of the local clocks 9 of the other apparatuses and generate difference information of the time stamp information. For example, when the OLT 1-1 is operating as a working OLT, the association processing unit 22*a* of the OLT 1-1 acquires a time stamp ts1 of the OLT 1-1 and performs association with time information as explained above. In addition to this operation, the association processing unit 22*a* of the OLT 1-1 further acquires time stamp information ts2 from the local clock 9 of the OLT 1-2 as well, calculates difference information (ts2−ts1), and inserts the difference information in a synchronization command (a TimeSync message). Therefore, the synchronization command has a transmission source Id, time information X, the time stamp ts1, and difference information D and provides the slave station apparatus 10 with correction information of an error during line switching.

Figure 16:
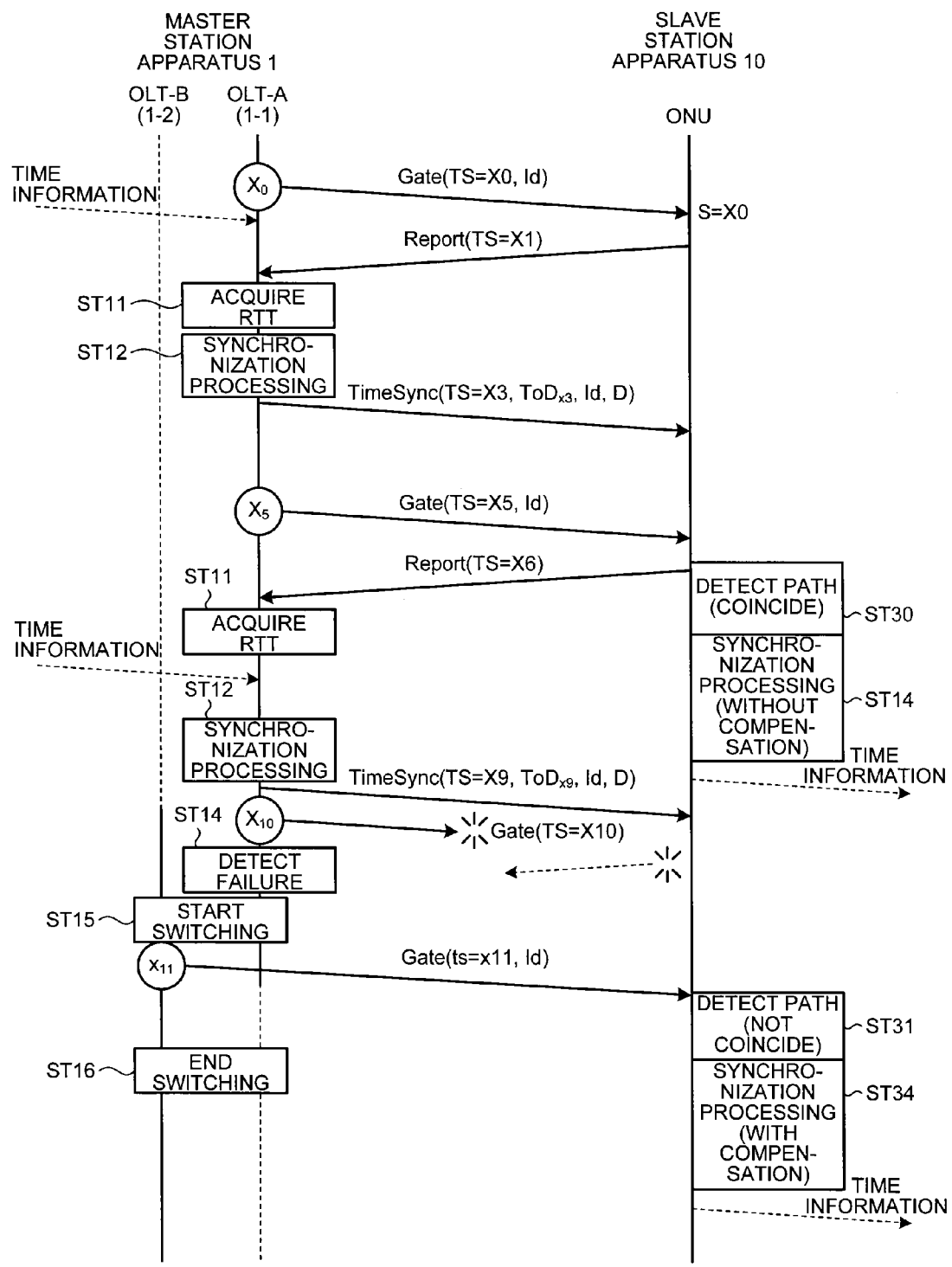
FIG. 16 is a sequence chart for explaining time synchronization control in the fifth embodiment of the present invention.

FIG. 16 shows a communication sequence in this embodiment. In FIG. 16, reference signs same as the reference signs in FIG. 13 represent the same or equivalent processing. The four parameters explained above are included in a TimeSync message output as a result of the synchronization processing (step ST12). The ONU 10 stores the received parameters including the difference information D. When starting the synchronization processing, the ONU 10 checks a communication path of the TimeSync message (i.e., checks whether a transmission source of the TimeSync message is a transmission source same as a transmission source of a time stamp that corrects the present local clock). When the transmission sources coincide with each other, the ONU 10 performs the synchronization processing as usual without taking a difference D into account (step ST30). On the other hand, when the transmission sources do not coincide with each other (step S31), the ONU 10 corrects, based on the difference D, time information generated by the synchronization processing (step ST34).

The ONU 10 performs the correction as indicated below.

$$Tod = ToD_{X,i} + [(S-X-D) \bmod(2^{32})] (16\ ns) \cdot rateRatio$$

In the formula,
mod represents a modulus operation
(16 ns) represents 16 nanoseconds
ToDX, i: time information of the TimeSync message
X: time stamp information of the TimeSync message
i: an identification number of a clock slave (ONU)
S: time stamp information of a local clock of the ONU
rateRatio: a ratio of a time period of the grand master apparatus GM to a time period of the local clock
D: difference information The difference information D generated by the OLT 1 is desirably generated taking into account a difference between transmission delay times in a downlink direction of the line 30-1 and the line 30-2. Therefore, the difference information D generated by the association processing unit 22a of the OLT 1-1 is calculated as indicated below.

$$D = (ts_2 - ts_1) + (RTT_2 - RTT_1) \cdot \frac{n_{down}}{n_{down} + n_{up}}$$

In the formula,
ts1: a time stamp of a local clock of the OLT 1-1
ts2: a time stamp of a local clock of the OLT 1-2
RTT1: a round trip time to the ONU 10 measured by the OLT 1-1
RTT2: a round trip time to the ONU 10 measured by the OLT 1-2
ndown: an effective refractive index of light of a downstream channel
nup: an effective refractive index of light of an upstream channel In the above calculation of the difference information D, to calculate the transmission delay times in the downlink direction of the line 30-1 and the line 30-2, the OLT 1 calculates the delay times in the down link direction using the RTTs and using a ratio of the delay times in the downlink direction to the round trip times. However, the difference information D can be calculated by any method as long as a time difference at a point when a signal reaches the ONU 10 can be compensated. It is not essential to use the RTTs.

In a PON system, a working OLT regularly measures an RTT. On the other hand, there are several methods in which a backup OLT measures an RTT. A first method is a method in which the backup OLT also transmits a signal to the ONU 10 by itself and calculates a RTT based on a response signal received from the ONU 10. A second method is a method in which the backup OLT detects a Gate message transmitted by the working OLT, receives a response signal (Report) to the Gate message in a receiver of the backup OLT, and calculates a RTT. In a Type-B protection, a signal transmitted by the ONU 10 is transmitted to both the redundant lines 30-1 and 30-2 by the splitter 40. Therefore, the backup OLT can also receive the Report. To calculate an RTT, the backup OLT has to acquire transmission timing of the Gate message and a time stamp during transmission from the working OLT. Information concerning a measured RTT is stored in an RTT storage memory 27.

Sixth Embodiment

In the embodiments explained above, the operation of the communication system that detects a communication failure as the line switching factor is explained. An embodiment in which a switching request for maintenance is detected as a line switching factor is explained below.

Figure 17:
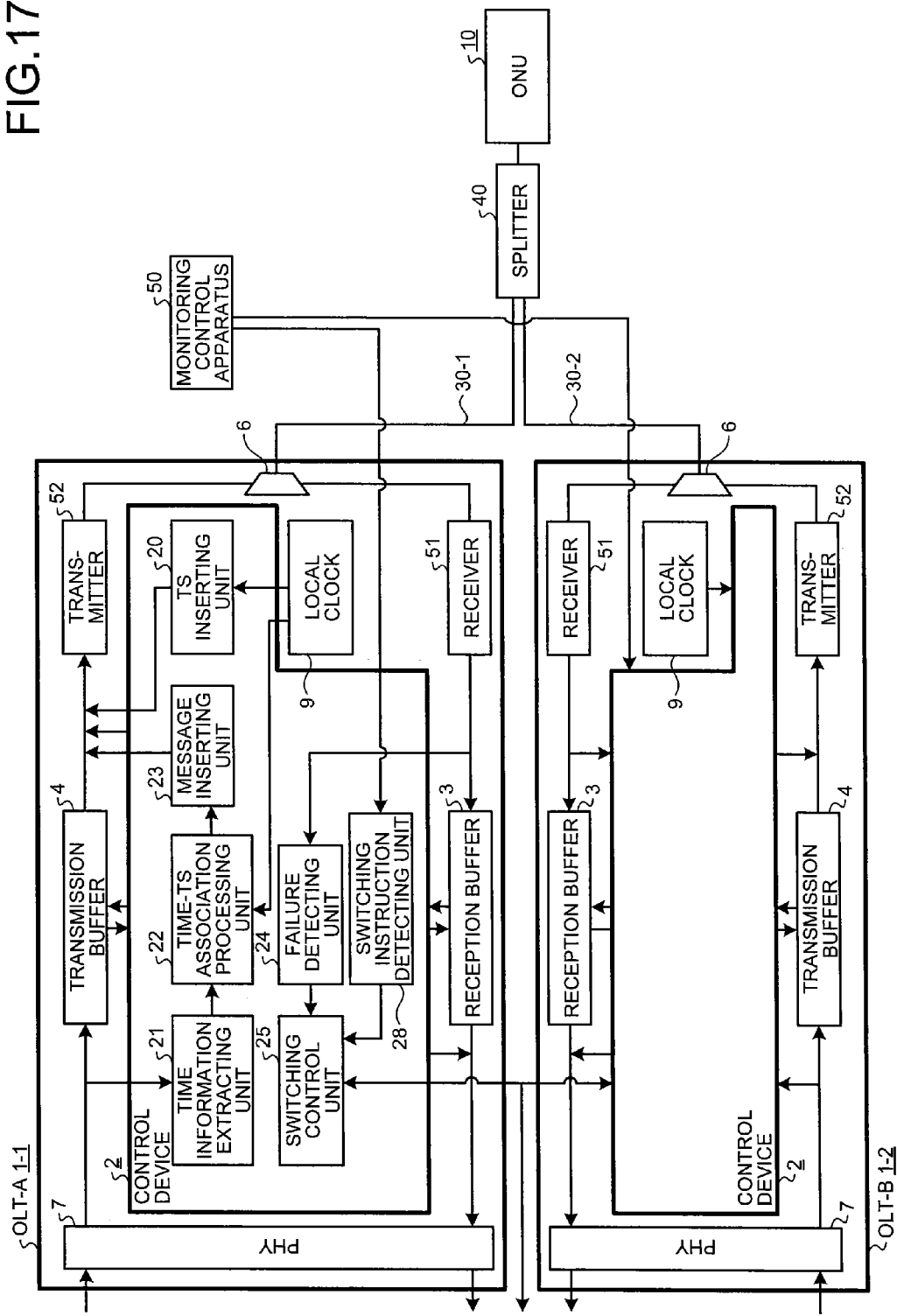
FIG. 17 is a configuration diagram of the configuration of a communication system in a sixth embodiment of the present invention.

FIG. 17 is a configuration diagram of a communication system in a sixth embodiment. In FIG. 17, reference numerals same as the reference numerals in FIG. 1, 4, or 15 represent the same or equivalent sections. In the communication system, a monitoring control apparatus 50 that performs monitoring control of the master station apparatuses 1 (the OLTs 1-1 and 1-2) is connected to the master station apparatuses 1. The monitoring control apparatus 50 not only outputs a control signal for instructing the operation of the master station apparatuses 1 and controls the master station apparatuses 1 but also acquires various warnings and status information from the master station apparatuses 1 and provides an administrator of the communication system with operation information. The monitoring control apparatus 50 can be set in a place where the master station apparatuses 1 are set or, when a plurality of master station apparatuses 1 are centrally managed in one place, can be set in another facility present in a remote place.

The control devices 2 of the OLTs include switching-instruction detecting units 28 configured to monitor a switching instruction signal transmitted from the monitoring control apparatus 50 and, when the switching instruction signal is detected, output switching information to the switching control units 25. In FIG. 17, the illustration of the configuration of the OLT 1-2 is simplified. However, the configuration of the OLT 1-2 is the same as the configuration of the OLT 1-1.

Switching of the communication lines 30-1 and 30-2 is executed not only when a communication failure is detected but also for performing maintenance of the communication system. In the embodiments explained above, the error suppression control of the synchronization processing involved in the line switching is performed after the communication failure occurs. However, it is desirable to perform the error suppression control in line switching involved in maintenance work as well. The maintenance work is performed for performing a failure diagnosis of a specific line and for repairing, replacement, and the like of a part of devices such as a substrate of the OLT 1.

In starting maintenance, when a switching command is input to the monitoring control apparatus 50 by an administrator or the like of the system, the monitoring control apparatus 50 transmits a switching instruction signal to any one of the OLT 1-1 and the OLT 1-2 or both. The transmission of the signal can be performed via any communication medium by radio or by wire. A maintenance administrator can input a signal to the master station apparatus 1 without using the monitoring control apparatus 50. The switching-instruction detecting unit 28 of the OLT, which receives the switching instruction signal, instructs the switching control unit 25 to switch a line. The switching control unit 25, which receives information concerning the instruction, starts the processing of line switching explained above in the embodiments.

Figure 18:
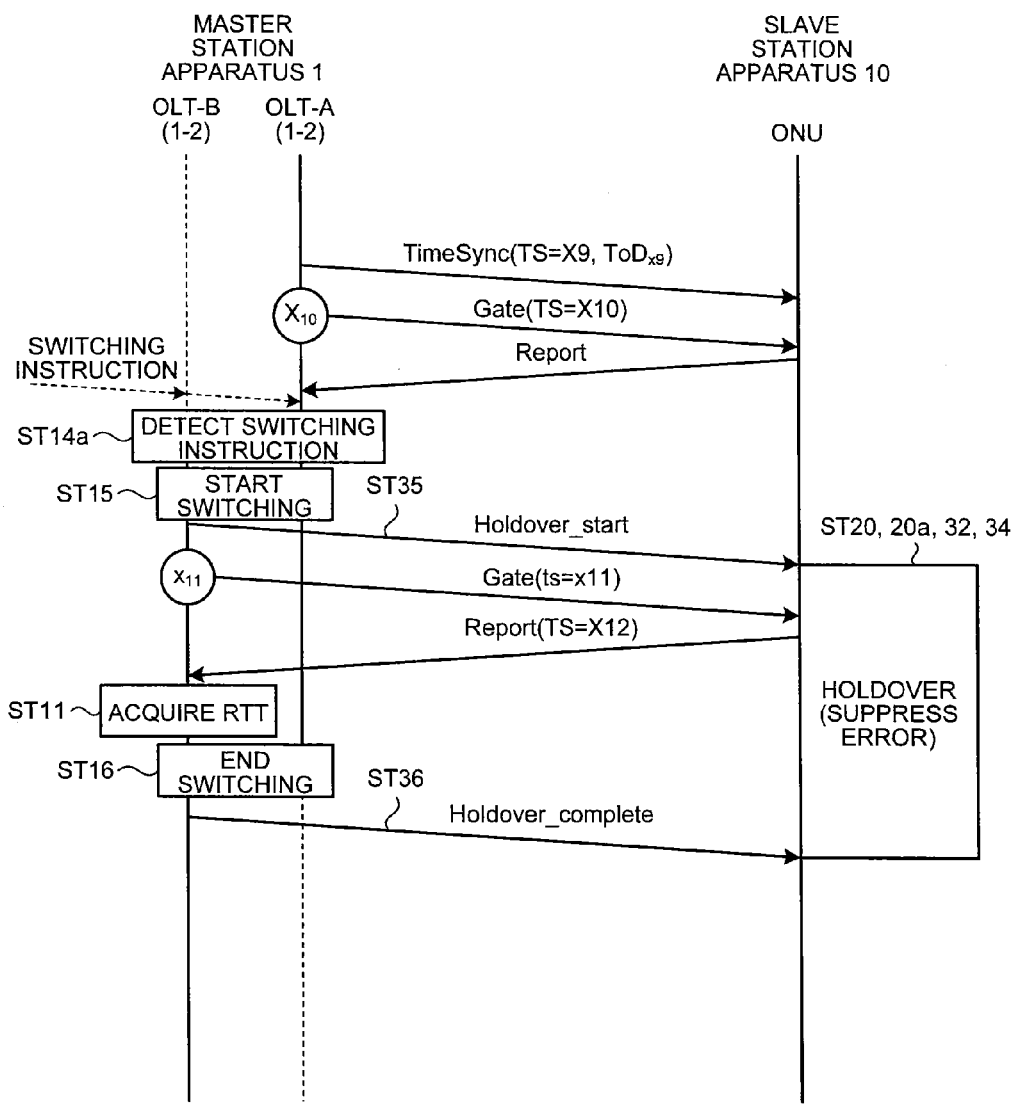
FIG. 18 is a sequence chart for explaining time synchronization control in the sixth embodiment of the present invention.

The switching-instruction detecting unit 28 transmits a line switching notification for notifying that line switching is performed to the slave station apparatus 10 via the transmitter 52. A sequence of the line switching notification and subsequent processing is shown in FIG. 18. In FIG. 18, reference signs same as the reference signs in FIG. 3, 8, 13, or 16 represent the same or equivalent processing. The master station apparatus 1 transmits a Holdover_start message to the slave station apparatus 10 as a switching notification (step ST35). Upon receiving the switching notification, the slave station apparatus 10 shifts to a holdover state to prepare for switching even if the slave station apparatus 10 has not detected a communication failure.

In the holdover state, the slave station apparatus 10 maintains control information for continuing communication such as LLID (Logical Link Identification) and, to make it possible to normally continue communication even after a line is switched, suppresses, at normal time, warning detection that causes link disconnection. An example of the warning detection is a time stamp drift error. Even if time stamp information included in a Gate message or the like substantially fluctuates according to the switching of the lines 30-1 and 30-2, during a holdover period, the slave station apparatus 10 detects the time stamp drift error as a line error not to perform processing for link disconnection.

Concerning suppression control for the time stamp drift error, the applicant filed the patent application as the PCT application (international application number) PCT/JP2010/006863. Concerning the suppression control, the invention described in the application is cited as content of the mode for carrying out the present invention. If error suppression processing during line switching of time synchronization processing is executed during the holdover period using the suppression control and a protocol of the suppression control, it is possible to suppress link disconnection to realize high-speed line switching and, at the same time, suppress an error of the time synchronization processing.

The switching notification transmitted at step ST35 can be multicast transmission in which an extended MPCP (Multi-Point Control Protocol) message addressed to a plurality of ONUs 10 is used or can be a unicast transmission in which an extended OAM (Operation Administration and Maintenance) message addressed to each of the ONUs 10 is used. The switching notification is created in a form in which a message type is described in a predetermined format. Therefore, a name of the switching notification is not limited to Holdover_start. A type of the message can be any type as long as the line switching can be anticipated or error suppression processing timing of the time synchronization processing can be learned from the message.

Upon receiving the switching notification, the slave station apparatus 10 shifts to the holdover state and starts the error suppression processing of the synchronization processing. The error suppression processing can be any processing explained in the first to fifth embodiments.

As an optional function, when the line switching ends, the master station apparatus 1 notifies the slave station apparatus 10 of the end of the line switching using a control message such as extended MPCP or extended OAM. Upon receiving this completion notification (Holdover_complete), the slave station apparatus 10 ends the holdover state and returns to a normal state. At this point, the slave station apparatus 10 ends the error suppression processing as well and returns to the normal state (step ST36).

Figure 19:
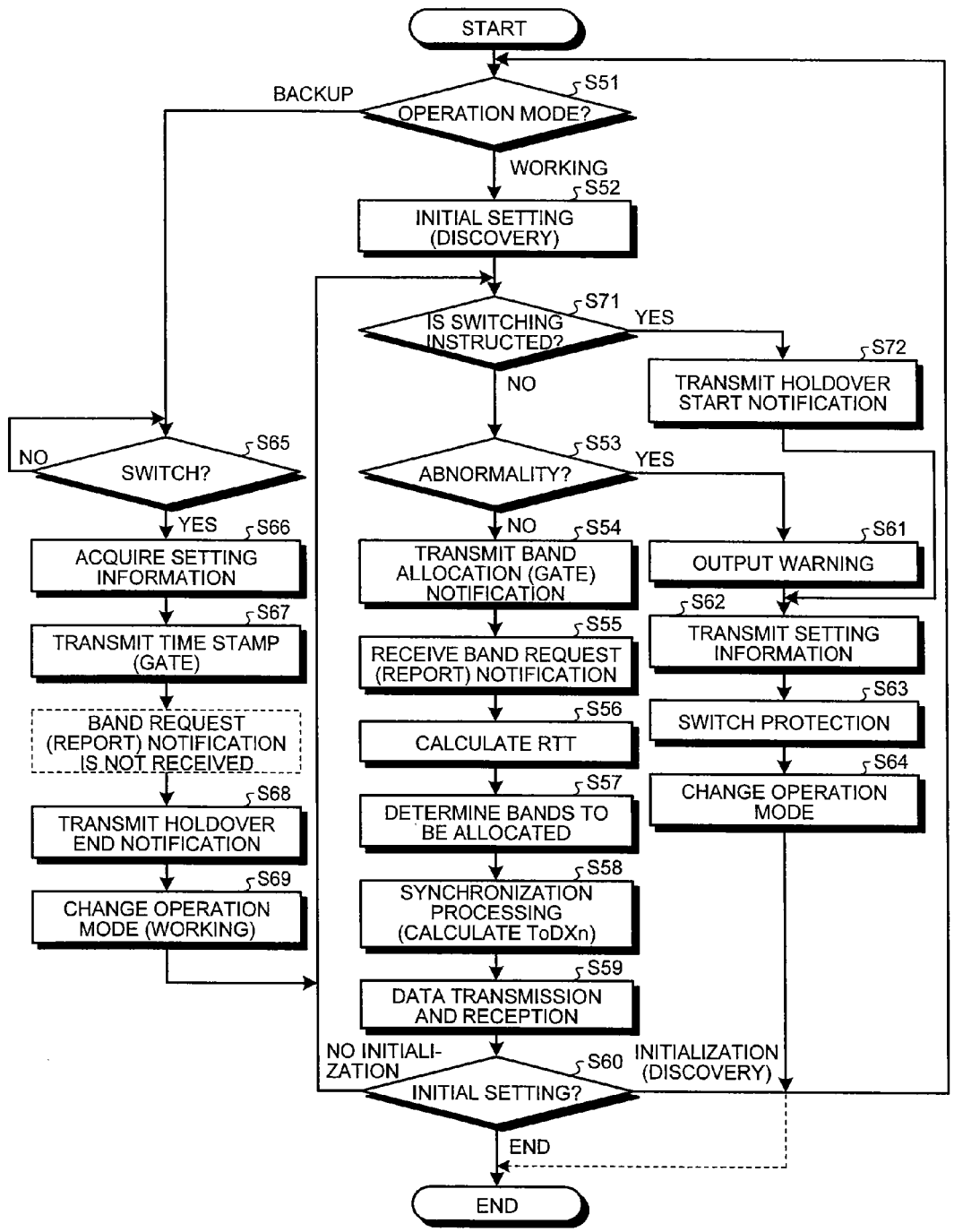
FIG. 19 is a flowchart for explaining processing by a control device of a master station apparatus in the sixth embodiment of the present invention.

FIG. 19 is a flowchart for explaining processing by the master station apparatus 1 in this embodiment. In FIG. 19, reference signs same as the reference signs in FIG. 7 represents the same or equivalent processing. At step S71, the control device 2 of the master station apparatus 1 checks whether a switching instruction is received from the monitoring control apparatus 50. When the switching instruction is received, the control device 2 transmits a holdover start notification, which is a line switching notification, via the transmitter 52 (step S72). The working OLT 1-1 or the backup OLT 1-2 can also transmit the line switching notification. When the backup OLT 1-2 transmits the line switching notification, the backup OLT 1-2 executes processing at step S72, for example, between steps S65 and S66.

Figure 20:
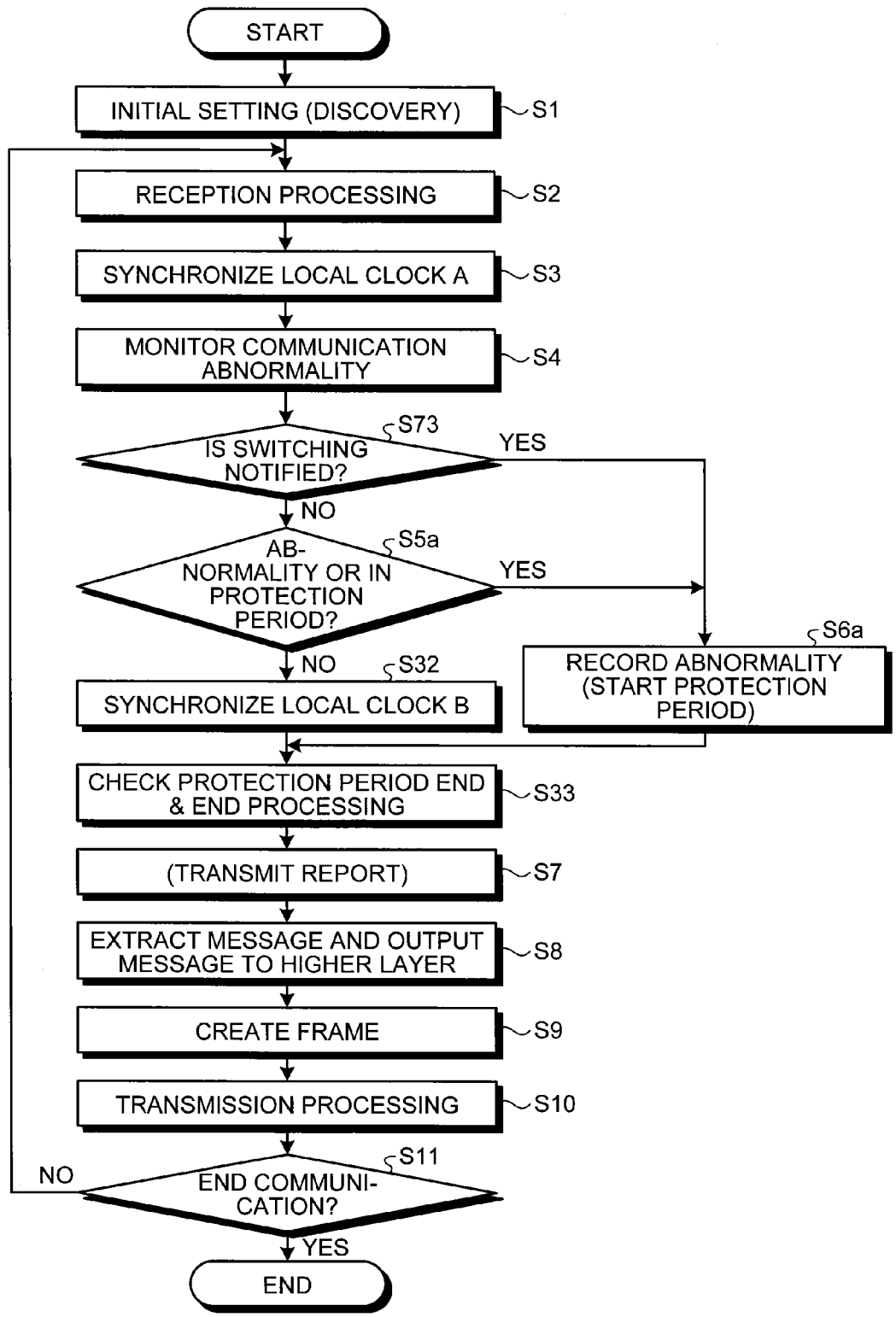
FIG. 20 is a flowchart for explaining processing by a control device of a slave station apparatus in the sixth embodiment of the present invention.

FIG. 20 is a flowchart for explaining processing by the slave station apparatus 10. In FIG. 20, reference signs same as the reference sigs in FIG. 6, 10, or 14 represent the same or equivalent processing. At step S73, the control device 11 of the slave station apparatus monitors whether a line switching notification is received via the receiver 142. When the line switching notification is received, the control device 11 shifts to a protection period, i.e., a period of the holdover state in the processing at step S6*a* irrespective of presence or absence of a communication abnormality. FIG. 20 shows processing by the lower layer shown in FIG. 10. However, processing by the higher layer is executed as in the embodiments explained above. The control device 11 determines, according to whether the control device 11 is in the protection period (the holdover state), whether the local clock A is selected or the local clock B is selected as a clock used for the synchronization processing (step S24 in FIG. 10). In the case of FIGS. 6 and 14, the same processing is performed except that step S32 in FIG. 20 is absent.

When the line switching notification is transmitted using the extended MPCP, the control device 11 notifies that the line switching notification is transmitted from the lower layer to the higher layer. When the extended OAM is used, because the extended OAM is a layer higher than the MPCP, the notification is automatically transferred to the higher layer. The lower layer acquires information concerning the notification from the higher layer. However, the lower layer can also detect the notification by itself. As another modification, the higher layer can also perform the processing such as the local clock B synchronization.

In general, to prevent an excessive reaction to a temporary problem of communication, abnormality detection for a communication line is designed to detect an abnormality for the first time when a problem is detected a plurality of times or more in a fixed detection period. Therefore, a fixed time is required for detection of a communication abnormality. In maintenance work, it is also possible to shut down one of the OLTs and cause the ONU 10 to detect an abnormality. However, for example, when communication such as sound communication is performed on a real time basis, if an instantaneous break of communication occurs, this leads to deterioration in a service provided to a user. Therefore, for example, when the maintenance work is performed, it is desirable to more quickly complete switching. According to this embodiment, the slave station apparatus 10 can more quickly cope with the line switching. Therefore, it is possible to improve the quality of a service that can be provided to a user on a network.

The embodiments of the present invention are explained above. The present invention is not limited to these embodiments. Any modification can be made as long as the modification is included in the gist of the present invention. For example, the communication system to which the communication method is applied does not need to be the PON system. The communication method can be likewise applied to an optical communication system in which an active element is used. The communication method is not limited to the optical communication and can be likewise applied to a communication system that performs communication between terminals using an electric signal.

The processing of the control device 2 of the OLT shown in FIG. 7 can be applied to the third to fifth embodiments as well. The control device 2 (a PON processor) of the OLT can execute the processing using a program executable by a computer. Therefore, the processing in FIGS. 7 and 19 can be described using a computer program. Similarly, in the control device 11 of the ONU 10, the processing described in FIGS. 6, 10, 11, 14 and 20 can be described using a computer program.

Figure 21:
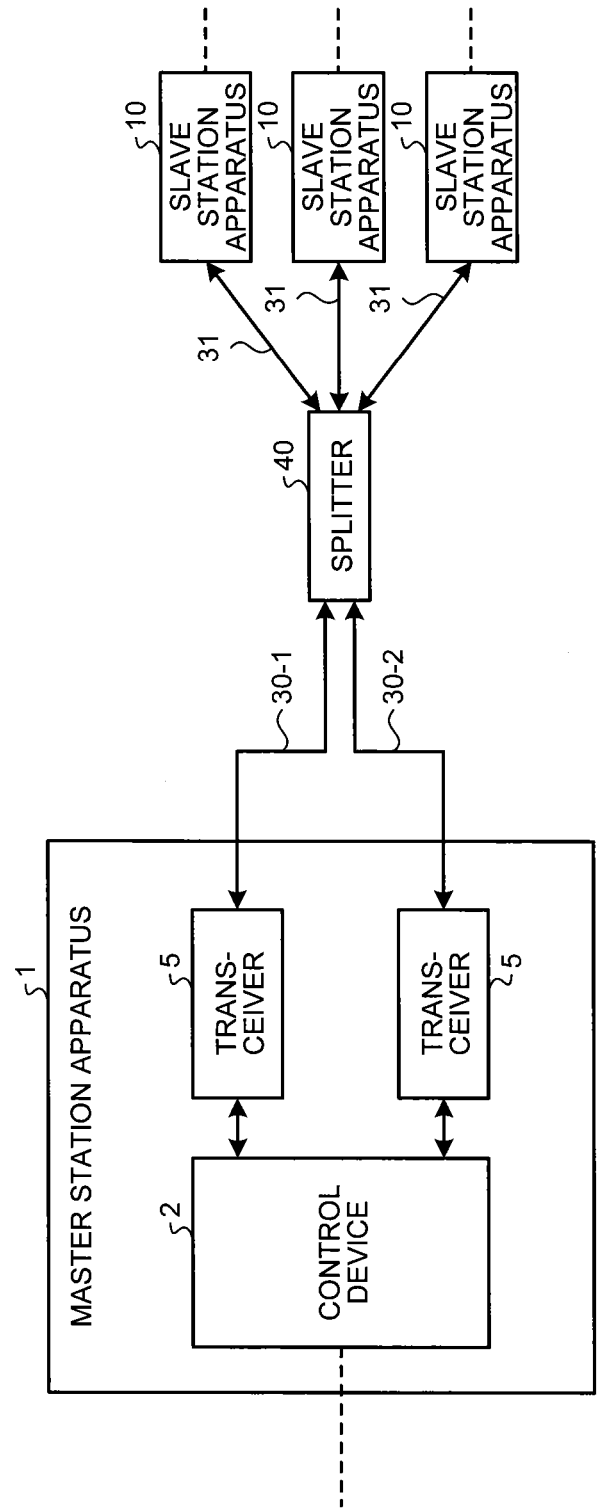
FIG. 21 is a configuration diagram of another configuration example of the communication system in the sixth embodiment of the present invention.

In the first to sixth embodiment, as shown in FIG. 1, plural control devices 2 are respectively provided to correspond to a plural transceivers 5. However, only one control device 2 can be provided as shown in FIG. 21. In this case, it is unnecessary to exchange setting information between the plural control devices 2 and provide the switch 8.

In the embodiments, application examples to not only the general purpose communication system but also IEEE 802.3 are explained. However, the present invention is not limited to this and can be carried out in communication systems that use other protocols. IEEE 1588 and other protocols can be used as a time synchronization protocol of the second network. It is assumed that IEEE 802.3AS is applied as a time synchronization protocol of the first network.

As a protocol of the lower layer of the first network, ITU-T G.987.3, G.984.3, and similar standards can also be used. The slave station apparatus 10 and the splitter 40 can be connected by redundant lines.

The master station apparatus 1 can not only receive a synchronization message from the grand master apparatus GM through the network 29 and convert the synchronization message into a synchronization command in the first network but also output a synchronization command from the master station apparatus 1 itself. A source of acquisition of time information is not limited to a specific source. For example, precise time information is acquired from a GPS receiving apparatus.

INDUSTRIAL APPLICABILITY

The present invention is suitable for time synchronization of a communication system in which communication lines are made redundant.

REFERENCE SIGNS LIST 1 master station apparatus
2, 11 control devices
3, 13 reception buffers
4, 12 transmission buffers
5, 14 transceivers
6, 15 WDM couplers
7, 16 PHYs
10 slave station apparatus
30-1, 30-2 communication lines
31 subscriber line (line, branch line)
40 splitter
51, 142 receivers
52, 143 transmitters
GM grand master apparatus
SL slave apparatus

The invention claimed is:

1. A time synchronization method for a communication system configured to perform protection switching, the communication system including a first network in which an OLT (Optical Line Terminal) and an ONU (Optical Network Unit) are connected via a plurality of physical lines including a working line and a backup line and a second network connected to the ONU,
the time synchronization method comprising:
a step in which the OLT transmits a synchronization signal to the ONU and the ONU synchronizes a clock of the ONU with a clock of the OLT using the received synchronization signal;
a step in which the OLT transmits a synchronization command including designated time information and timing information to the ONU;
a switching step for performing a protection switching in which the OLT uses, when detecting a communication failure of an uplink signal in the working line, the backup line as a new working line instead of the working line; and
a time synchronization step in which the ONU executes, when not detecting a switching condition for the protection switching based on a downlink signal transmitted from the OLT, synchronization processing for correcting the time information included in the synchronization command based on the clock of the ONU and the timing information and transmitting the synchronization command to the second network and executing, when detecting the switching condition for the protection switching or receiving a switching notification from the OLT, processing for suppressing a synchronization error due to a difference between the clock of the ONU and the timing information.

2. The time synchronization method according to claim 1, wherein, in the time synchronization step, the ONU protects the clock before the protection switching from the synchronization by the synchronization signal after the protection switching.

3. The time synchronization method according to claim 1, wherein, in the time synchronization step, when detecting the switching condition for the protection switching, the ONU suppresses an output of time information after the synchronization processing based on the synchronization command received before the protection switching.

4. The time synchronization method according to claim 3, wherein, in the time synchronization step, the ONU determines, based on information concerning a transmission source of the synchronization signal, the suppression of the output of the time information.

5. The time synchronization method according to claim 1, wherein, in the time synchronization step, the ONU corrects the time information based on information concerning an error of the synchronization signal caused by the protection switching.

6. A slave station apparatus comprising:
a receiver connected to a master station apparatus via a first network, which is configured using redundant lines, and configured to receive a synchronization signal for synchronizing with the master station apparatus and a synchronization command including time information transferred to a second network;
a clock configured to measure time in synchronization with the synchronization signal received from the master station apparatus;
a control device configured to perform synchronization processing for extracting the time information and timing information from the synchronization command and correcting the time information based on the timing information and output time of the clock and execute, when detecting a factor of occurrence of line switching in the first network or receiving a switching notification from the master station apparatus in communication with the master station apparatus, processing for suppressing a synchronization error due to a difference between the clock and the timing information; and
an interface device connected to the second network and configured to transmit, as a synchronization message of the second network, the time information corrected by the control device.

7. The slave station apparatus according to claim 6, further comprising another clock configured to continue to measure, even after the line switching, time based on the synchronization signal before the line switching.

8. The slave station apparatus according to claim 6, when detecting the line switching, the control device suppresses an output of the synchronization message based on the synchronization command received before the line switching.

9. The slave station apparatus according to claim 8, wherein the control device executes, based on information concerning a transmission source of the synchronization signal, the suppression of the output of the synchronization message.

10. The slave station apparatus according to claim 6, wherein the control device corrects the time information based on information concerning an error of the synchronization signal caused by the line switching.

11. The slave station apparatus according to claim 6, wherein the control device detects the line switching based on a communication failure of the first network.

12. The slave station apparatus according to claim 6, wherein the control device detects the line switching based on a switching notification from the master station apparatus.

13. The slave station apparatus according to claim 6, wherein the clock is an MPCP (Multi-point control Protocol) counter, and the synchronization signal is a time stamp received using the MPCP.

14. The slave station apparatus according to claim 6, wherein the first network is a PON (Passive Optical Network).

15. A master station apparatus configured to transmit time information to a second network connected to a slave station apparatus via a first network, which is configured using redundant lines, the master station apparatus comprising:
a plurality of transceivers connected to the first network; and
a control device configured to transmit, to the slave station apparatus via one of the plurality of transceivers, a synchronization signal used for synchronization of transmission and reception timing on the first network and to perform, when a failure occurs in a working line among the redundant lines due to an uplink signal received by the one of the plurality of transceivers, line switching for using a backup line as a new working line and for using anther of the plurality of transceivers to transmit via the new working line, wherein the control device transmits, to the slave station apparatus via the one of the plurality of transceivers, a synchronization command including time information transmitted to the second network and timing information in the first network and, when the line switching is performed, compensates for the time information with a delay time of the new working line, and
synchronization processing between the slave station apparatus and the master station apparatus is stopped when the failure occurs in the working line.

16. The master station apparatus according to claim 15, wherein
the one of the plurality of transceivers performs communication of a wavelength division multiple system by using, for downlink transmission, an optical signal having wavelength different from an uplink optical signal, and
the control device corrects the time information based on a delay time obtained by correcting a round trip time of the first network based on an effective refractive index of the uplink optical system and the downlink optical signal.

17. The master station apparatus according to claim 15, wherein the control device corresponds to each of the plurality of transceivers and is divided into a working control device and a backup control device, and, according to execution of the line switching, the backup control device functions as a new working control device and performs communication in place of the working control device.

18. The master station apparatus according to claim 15, wherein, when performing the line switching, the control device transmits a line switching notification via the transceiver.

19. A control device of a slave station apparatus connected to a master station apparatus via a first network, which is configured using redundant lines, and configured to receive a synchronization signal for synchronizing with the master station apparatus and a synchronization command including time information transferred to a second network, wherein the control device performs synchronization processing for extracting the time information and timing information from the synchronization command and correcting the time information based on the timing information and output time of a local clock of the slave station apparatus and executes, when detecting a communication failure in the first network or receiving a signal for notifying switching from the master station apparatus in communication with the master station apparatus, processing for suppressing a synchronization error due to a difference between the local clock and the timing information, and synchronization processing between the slave station apparatus and the master station apparatus is stopped when the communication failure occurs in the first network.

20. A control device of a master station apparatus configured to transmit time information to a second network connected to a slave station apparatus via a transceiver connected to a first network, which is configured using redundant lines, wherein the control device transmits, to the slave station apparatus via the transceiver, a synchronization signal used for synchronization of transmission and reception timing on the first network, performs, when a failure occurs in a working line among the redundant lines due to an uplink signal received by the transceiver, line switching for using a backup line as a new working line, transmits, to the slave station apparatus via the transceiver, a synchronization command including time information transmitted to the second network and timing information in the first network, and, when the line switching is performed, compensates for the time information with a delay time of the new working line, and synchronization processing between the slave station apparatus and the master station apparatus is stopped when the failure occurs in the working line.

21. A program for causing a computer to execute the time synchronization method according to claim 1.

* * * * *